United States Patent
Huang et al.

(10) Patent No.: US 12,459,118 B2
(45) Date of Patent: Nov. 4, 2025

(54) METHOD OF COORDINATING MOTION OF A ROBOT AND VEHICLE IN AN INDEPENDENT CART SYSTEM

(71) Applicant: Rockwell Automation Technolgies, Inc., Mayfield Heights, OH (US)

(72) Inventors: Yuhong Huang, Acton, MA (US); Jatin P. Bhatt, Highland Heights, OH (US); Alexander G. Brynildsen, Milwaukee, WI (US); Keith D. Carter, Locust, NC (US); Chloe David, Milwaukee, WI (US); Bhanu K. Gouda, Reminderville, OH (US); Robert B. Hirschinger, Waukesha, WI (US); Michael D. Lennard, Atlanta, GA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 241 days.

(21) Appl. No.: 18/138,853

(22) Filed: Apr. 25, 2023

(65) Prior Publication Data
US 2024/0359324 A1  Oct. 31, 2024

(51) Int. Cl.
 *B25J 9/16* (2006.01)
 *B25J 5/00* (2006.01)
 *B25J 9/00* (2006.01)

(52) U.S. Cl.
 CPC ............. *B25J 9/1664* (2013.01); *B25J 5/005* (2013.01); *B25J 9/0093* (2013.01); *B25J 9/162* (2013.01)

(58) Field of Classification Search
 CPC ........ B25J 9/1664; B25J 5/005; B25J 9/0093; B25J 9/162
 See application file for complete search history.

(56) References Cited

U.S. PATENT DOCUMENTS 9,149,927 B2 * 10/2015 Sturm .................. A61G 7/1046
10,261,491 B1 * 4/2019 Dunham .............. G05B 19/298
(Continued)

FOREIGN PATENT DOCUMENTS

WO   WO-2022212016 A1 * 10/2022   ....... G05B 19/41895

OTHER PUBLICATIONS

IPSearch History Jun. 18, 2025 UTC; InnovationQ+; https://iq.ip.com/discover (Year: 2025).*

*Primary Examiner* — Gene O Crawford
*Assistant Examiner* — Abby A Jorgensen
(74) *Attorney, Agent, or Firm* — Boyle Fredrickson, S.C.

(57) ABSTRACT

Motion is coordinated between a robot and a mover in an independent cart system. A first mover for the independent cart system is located at an initial position, where the robot is mounted on the first mover. A motion trajectory command, defining motion of the robot and the first mover, is received at a motion controller. A mover command is generated for the first mover and a robot motion command is generated for the robot as a function of the motion trajectory command at the motion controller. The mover command is transmitted to a segment controller in a track segment on which the first mover is located, and the robot motion command is transmitted to a robot control system. Operation of the first mover is controlled with the segment controller in tandem with controlling operation of the robot with the robot control system responsive to the robot motion command.

16 Claims, 17 Drawing Sheets

(56) References Cited

U.S. PATENT DOCUMENTS

| | | | |
|---|---|---|---|
| 10,717,365 B2* | 7/2020 | Huang | B65G 43/00 |
| 10,926,406 B2* | 2/2021 | Prüssmeier | B25J 9/106 |
| 10,926,418 B2 | 2/2021 | Lu et al. | |
| 10,985,685 B1 | 4/2021 | Sun et al. | |
| 11,303,242 B2 | 4/2022 | Sun et al. | |
| 11,829,144 B2* | 11/2023 | Wernersbach | G05D 1/0212 |
| 2008/0188986 A1 | 8/2008 | Hoppe | |
| 2017/0151664 A1 | 6/2017 | Makino et al. | |
| 2019/0084781 A1 | 3/2019 | Huang et al. | |
| 2019/0146451 A1* | 5/2019 | Bhatt | G05B 19/19 |
| | | | 700/186 |
| 2019/0160609 A1 | 5/2019 | Nakamura et al. | |
| 2020/0148240 A1* | 5/2020 | Desotelle | B61B 13/08 |
| 2021/0253351 A1* | 8/2021 | Huang | G05B 19/042 |
| 2021/0347058 A1 | 11/2021 | Chalofsky et al. | |
| 2021/0403252 A1* | 12/2021 | Crum | B65G 47/38 |
| 2022/0324663 A1 | 10/2022 | Seal et al. | |

* cited by examiner

METHOD OF COORDINATING MOTION OF A ROBOT AND VEHICLE IN AN INDEPENDENT CART SYSTEM

BACKGROUND INFORMATION

The subject matter disclosed herein relates to coordinating motion of a robot mounted on a vehicle in an independent cart system with motion of one or more vehicles in the independent cart system. More specifically, a single robot may be utilized for various operations in cooperation with one or more vehicles in the independent cart system.

Motion control systems utilizing movers and linear drives in an independent cart system can be used in a wide variety of processes (e.g. packaging, manufacturing, and machining) and can provide an advantage over conventional conveyor belt systems with enhanced flexibility, extremely high-speed movement, improved positioning accuracy, and mechanical simplicity. The motion control system includes a set of independently controlled vehicles, also referred to herein as "movers," each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

In some applications, it would be desirable to mount the actuator, such as a robot, on the mover. It would also be desirable to coordinate motion of the robot with one or more movers for the independent cart system.

BRIEF DESCRIPTION

According to one embodiment of the invention, a method for coordinating motion of a robot with an independent cart system is disclosed. The independent cart system includes a track and a multiple movers configured to travel along the track. The robot is mounted on a first mover for the independent cart system. The method includes positioning the first mover at a load position and receiving a first motion trajectory command for the robot at a robot motion controller. A load is loaded on a second mover for the independent cart system with the robot following the first motion trajectory command. A first mover command is generated for the first mover, and a second mover command is generated for the second mover. The first and second mover commands cause the first mover and the second mover to travel together along the track. The first mover is positioned at an unload position, and a second motion trajectory command for the robot is received at the robot motion controller. The load is unloaded from the second mover for the independent cart system with the robot following the second motion trajectory command.

According to another embodiment of the invention, a method for coordinating motion of a robot with an independent cart system is disclosed. The independent cart system includes a track, having multiple track segments, and multiple movers configured to travel along the track. The robot is mounted on a first mover for the independent cart system. The method includes positioning a first mover for the independent cart system at an initial position and receiving a motion trajectory command for the robot at a motion controller. The motion trajectory command defines motion of the robot and the first mover. A mover command for the first mover is generated as a function of the motion trajectory command at the motion controller, and a robot motion command for the robot is similarly generated as a function of the motion trajectory command at the motion controller. The mover command is transmitted to a segment controller in one of the track segments on which the first mover is located, and the robot motion command is transmitted to a robot control system. Operation of the first mover is controlled with the segment controller in tandem with controlling operation of the robot with the robot control system responsive to the robot motion command.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
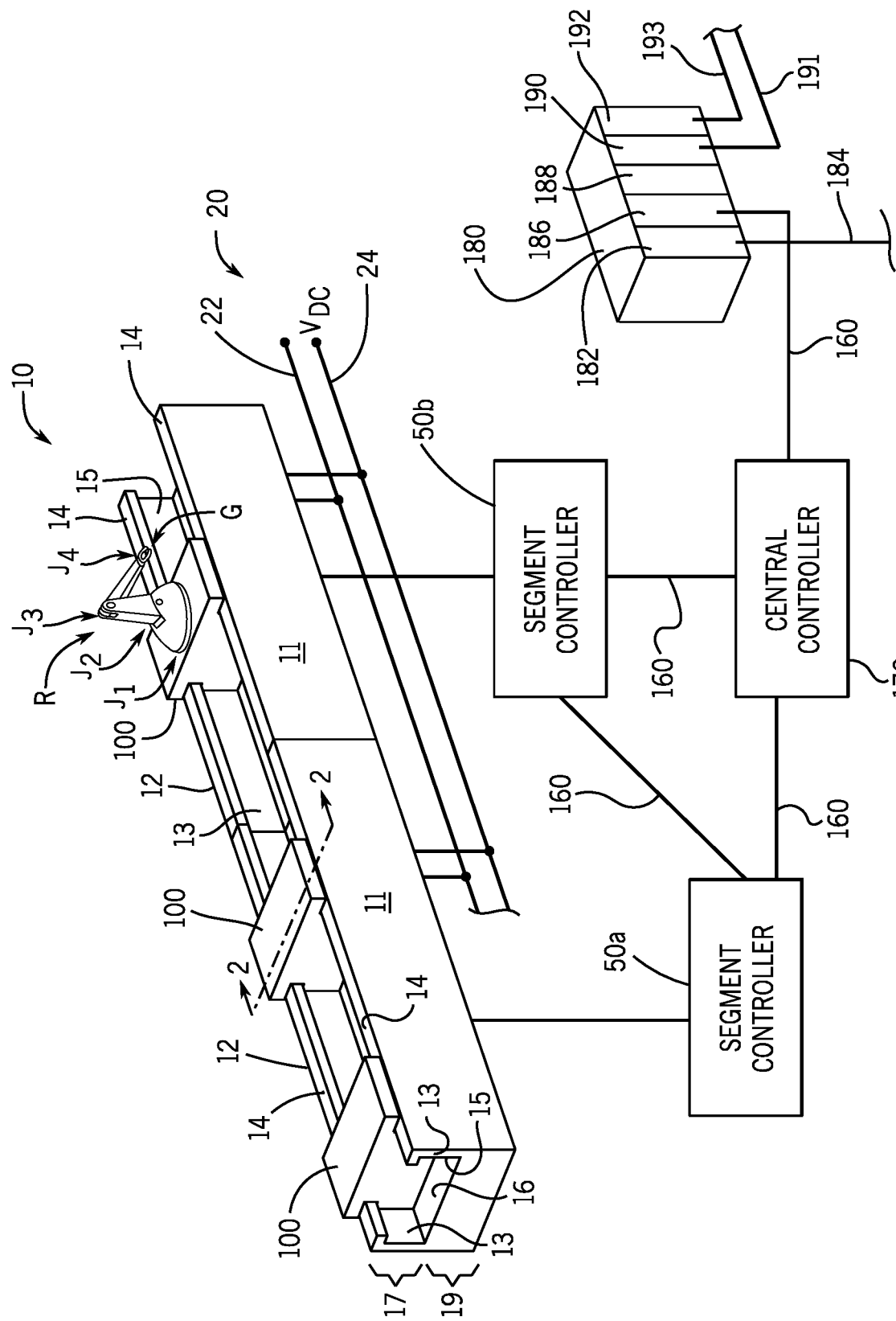
FIG. 1 is a schematic representation of an exemplary control system for an independent cart transport system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method of coordinating motion of a robot with one or more movers for an independent cart system. A motion controller is configured to receive a motion command for a robot mounted on one of the movers in the independent cart system. The motion command defines a desired motion trajectory for an end effector of the robot as the robot travels with the mover along the track. The motion controller converts the motion command for the robot to separate motion commands for each axis of the robot and for the mover on which the robot is mounted. The motion controller transmits the motions commands to controllers for each axis and for the mover in tandem such that the combined motion of the mover and the robot axes achieve the desired motion trajectory for the robot.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In some applications, track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The track may additionally include merging and diverging segments to either combine multiple paths into a single path or split a path into multiple paths, respectively. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

The mover 100 is carried along the track 10 by a linear drive system. The linear drive system is incorporated in part on each mover 100 and in part within each track segment 12. According to the illustrated embodiment, drive coils 150 are positioned along the length of each track segment, and one or more drive members 120 are mounted to each mover 100. It is contemplated that the drive members may be drive magnets, steel back iron and teeth, conductors, or any other suitable member that will interact with the electromagnetic fields generated by the coils 150 to propel each mover 100 along the track 10. For convenience, each drive member 120 will be discussed herein as a drive magnet. Alternately, it is contemplated that drive members 120 may be mounted along the length of each track segment and one or more drive coils 150 may be mounted to each mover 100 with the associated controllers to regulate current flow in each drive coil also mounted to each mover.

Figure 3:
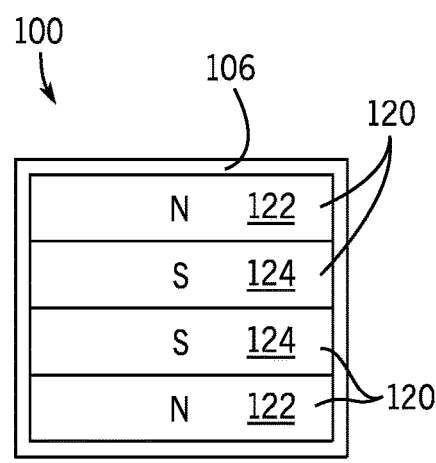
FIG. 3 is a bottom plan view of the exemplary mover of FIG. 2.
Figure 4:
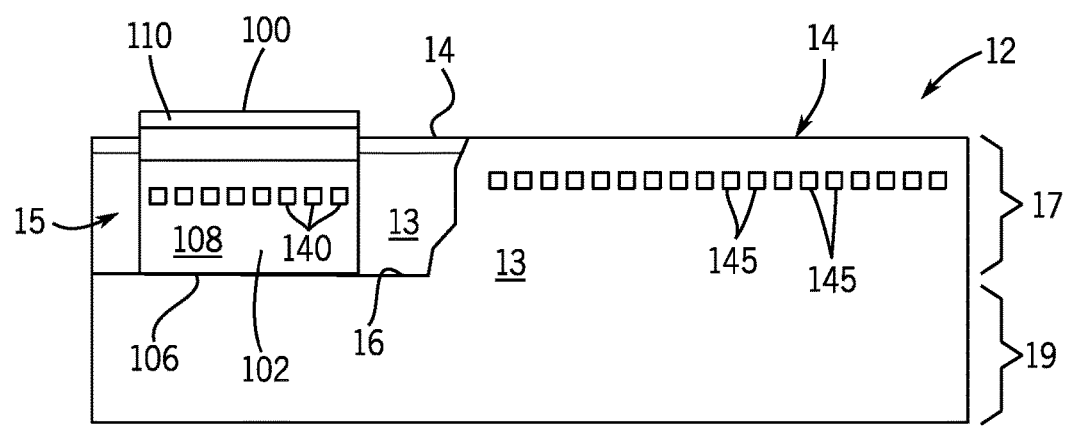
FIG. 4 is a partial side cutaway view of the mover and track segment of FIG. 2.

With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. According to still another embodiment, the drive magnets 120 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 120 may be utilized without deviating from the scope of the invention.

Figure 5:
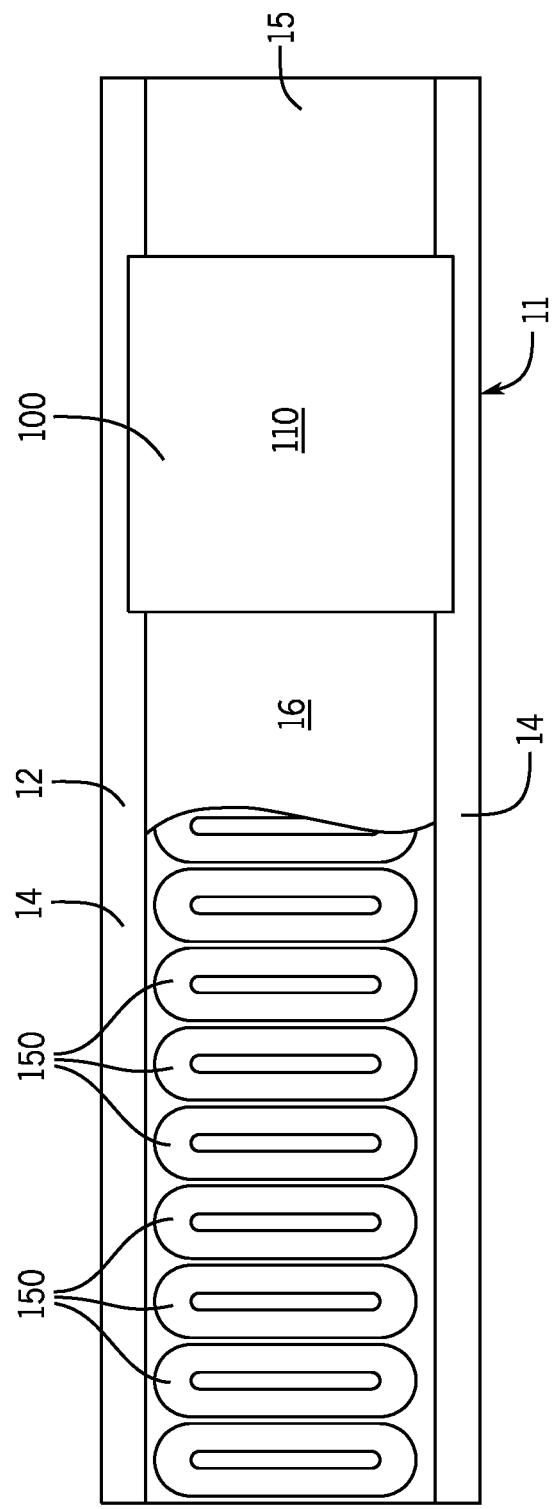
FIG. 5 is a partial top cutaway view of the mover and track segment of FIG. 2.

The linear drive system further includes a series of coils 150 spaced along the length of the track segment 12. With reference also to FIG. 5, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

Turning next to FIGS. 6-9, another exemplary transport system for moving articles or products is illustrated. The transport system includes a track 10 made up of multiple segments 12. According to the illustrated embodiments the segments define a generally closed loop supporting a set of movers 100 movable along the track 10. The illustrated track 10 includes four straight segments 12 with two straight segments 12 located along each side of the track and spaced apart from the other pair. The track 10 also includes four curved segments 12' where a pair of curved segments 12' is located at each end of the track 10 to connect the pairs of straight segments 12. The four straight segments and the four curved segments form a generally oval track and define a continuous path over which each of the movers 100 may travel. It is understood that track segments of various sizes, lengths, and shapes may be connected together to form a track 10 without deviating from the scope of the invention.

Figure 6:
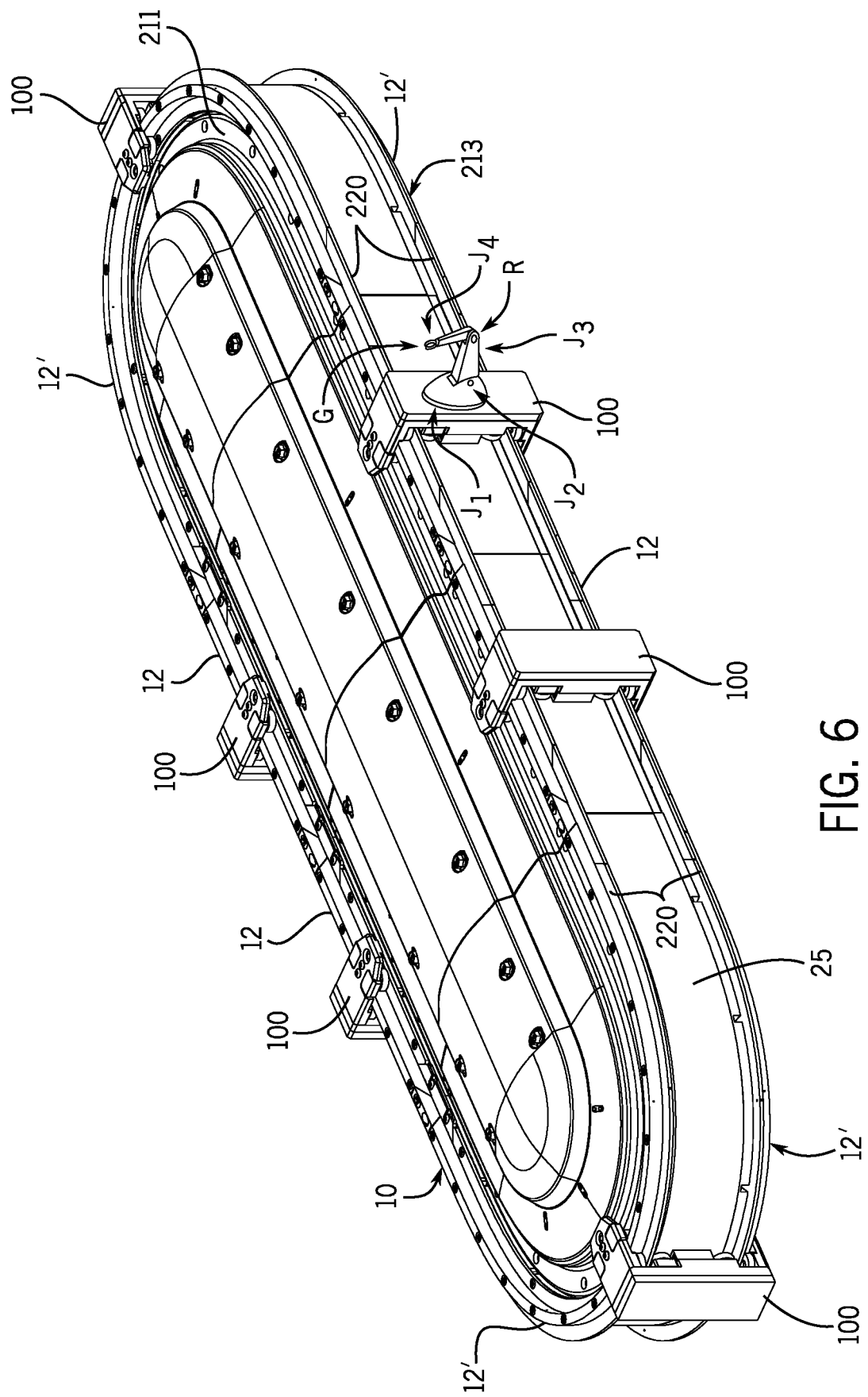
FIG. 6 is an isometric view of an exemplary independent cart transport system incorporating multiple movers travelling along a curvilinear track according to another embodiment of the present invention.

In FIG. 6, the track 10 is oriented in a horizontal plane. It is contemplated that the tracks 10 may be installed in different orientations, such as sloped or vertical, and include different shaped segments including, but not limited to, straight segments, inward bends, outward bends, up slopes, down slopes and various combinations thereof. For convenience, and unless otherwise specified, the horizontal orientation of the track 10 shown in FIG. 6 will be discussed herein. The movers 100 will travel along the track and take various orientations according to the configuration of the track 10 and the relationships discussed herein may vary accordingly.

Figure 7:
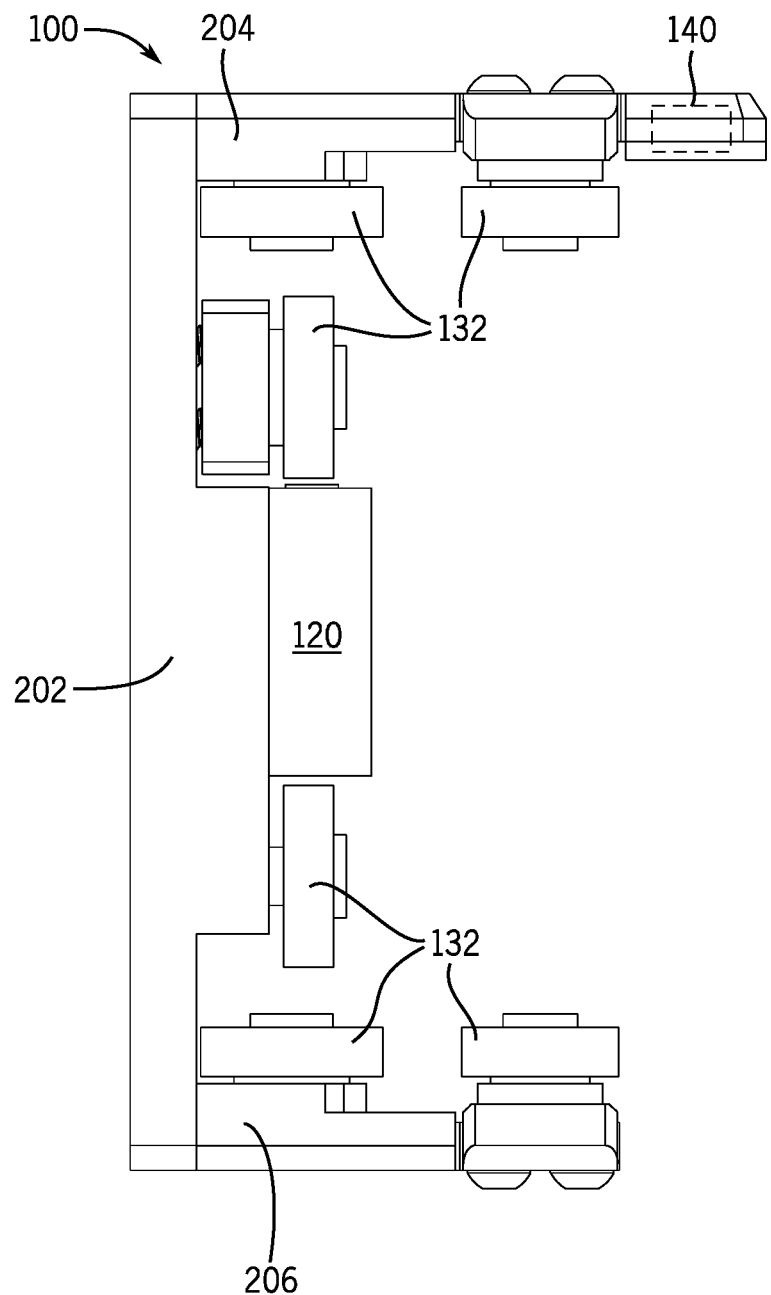
FIG. 7 is a side elevational view of one embodiment of a mover from the transport system of FIG. 6.

With reference to FIG. 7, another embodiment of an exemplary mover 100 is illustrated, where the mover 100 is configured to travel on the embodiment of the track 10 illustrated in FIG. 6. The illustrated mover 100 includes a side member 202, a top member 204, and a bottom member

206. The side member 202 extends for a height at least spanning a distance between the rail 220 on the top surface 211 of the track 10 and the rail 220 on the bottom surface 213 of the track 10 and is oriented generally parallel to a side surface 25 of the track 10 when the mover is mounted to the track 10. The top member 204 extends generally orthogonal to the side member 202 at a top end of the side member 202 and extends across the rail 220 on the top surface 211 of the track 10. According to the illustrated embodiment, a position magnet 140 is mounted within the top member 204 and is configured to align with a sensor 145 (see FIG. 8) mounted within the top surface 211 of the track segment. The bottom member 206 extends generally orthogonal to the side member 202 at a bottom end of the side member 202 and extends across the rail 220 on the bottom surface 213 of the track 10. The mover 100 includes multiple rollers 132 configured to engage the rails 220 on the top and bottom surfaces 211, 213 as will be discussed in more detail below.

Each track segment 12 includes a number of independently attached rails 220 on which each mover 100 runs. According to the illustrated embodiments, rails 220 extend generally along the outer periphery of the track 10. A first rail 220 extends along an upper surface 211 of each segment and a second rail 220 extends along a lower surface 213 of each segment. It is contemplated that each rail 220 may be a singular, molded or extruded member or formed from multiple members. It is also contemplated that the cross section of the rails 220 may be circular, square, rectangular, or any other desired cross-sectional shape without deviating from the scope of the invention. The rails 220 generally conform to the curvature of the track 10 thus extending in a straight path along the straight track segments 12 and in a curved path along the curved track segments 12'. The rails 220 may be thin with respect to the dimensions of the track 10 and span only a partial width of the surface of the track 10 on which it is attached.

Figure 8:
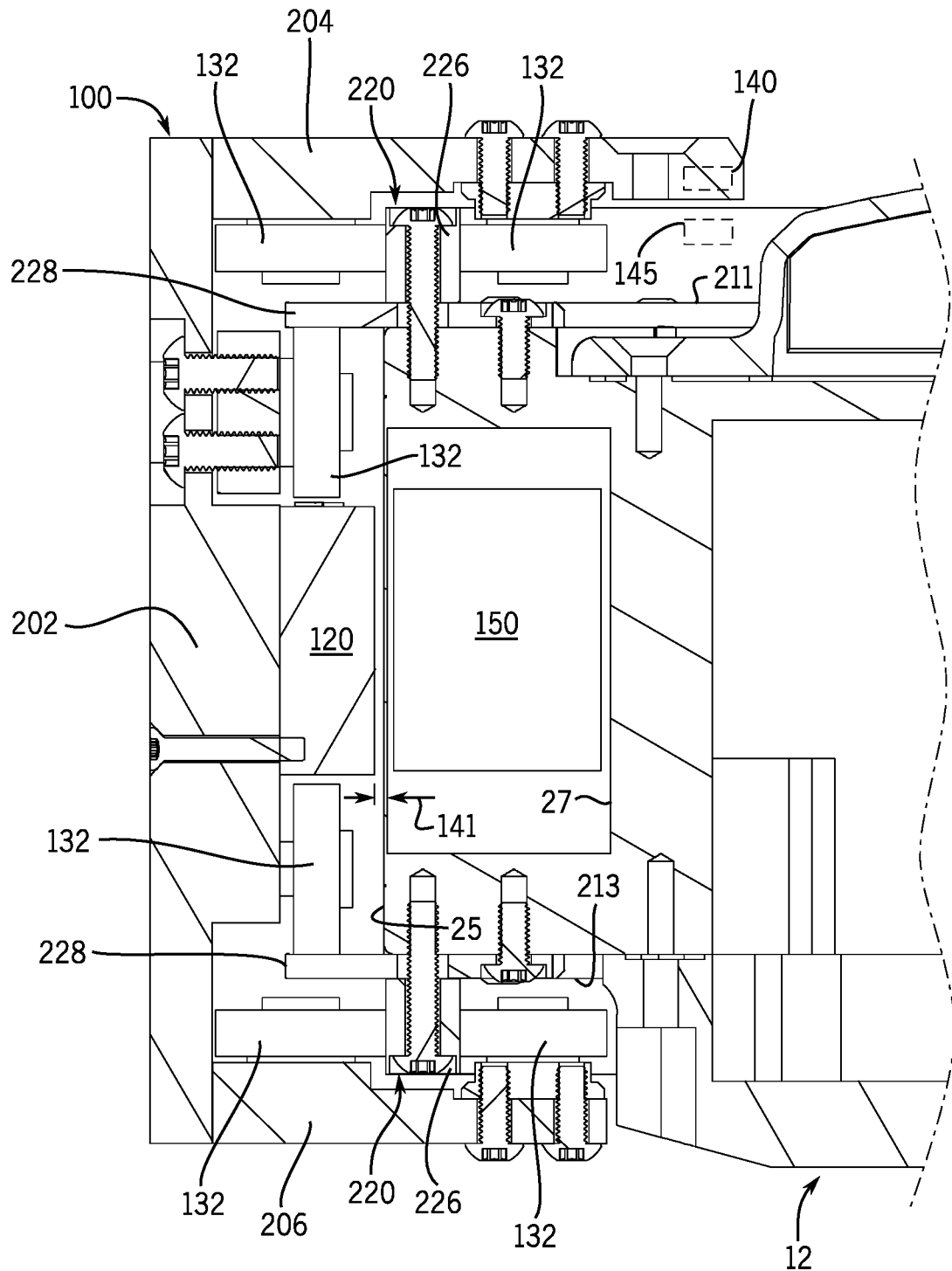
FIG. 8 is a partial sectional view of the transport system of FIG. 6.

With reference also to FIG. 8, the illustrated embodiment of the rail 220, positioned along each of the top and bottom surfaces 211, 213, includes two track portions 226, 228, where a first track portion 226 is generally rectangular and is positioned along the top surface 211 of the track. A second track portion 228 is generally rectangular and is positioned to protrude from the side of the track generally orthogonal to the first track portion 226. One or more movers 100 are mounted to and movable along the rails 220 on the track 10. A first set of rollers 132 are mounted on the lower side of the top member 204 and are configured to engage either side of the first track portion 226 of the rail 220 mounted to the upper surface 211 of the track segment. According to the illustrated embodiment, two pairs of rollers 132 are mounted to the lower side of the top member 204 with a first pair located along a first side of the first track portion 226 and a second pair located along a second side of the first track portion 226 of the upper rail 220. A third pair of rollers 132 is mounted on the side member 202 and extend below the second track portion 228 of the upper rail. Another set of rollers 132 are mounted on the upper side of the bottom member 206 and are configured to engage either side of the first track portion 226 of the rail 220 mounted to the bottom surface 213 of the track segment. According to the illustrated embodiment two pairs of rollers 132 are mounted to the upper side of the bottom member 206 with a first pair located along a first side of the first track portion 226 and a second pair located along a second side of the first track portion 226 of the lower rail 220. A third pair of rollers 132 is mounted on the side member 202 and extend above the second track portion 228 of the lower rail.

Figure 9:
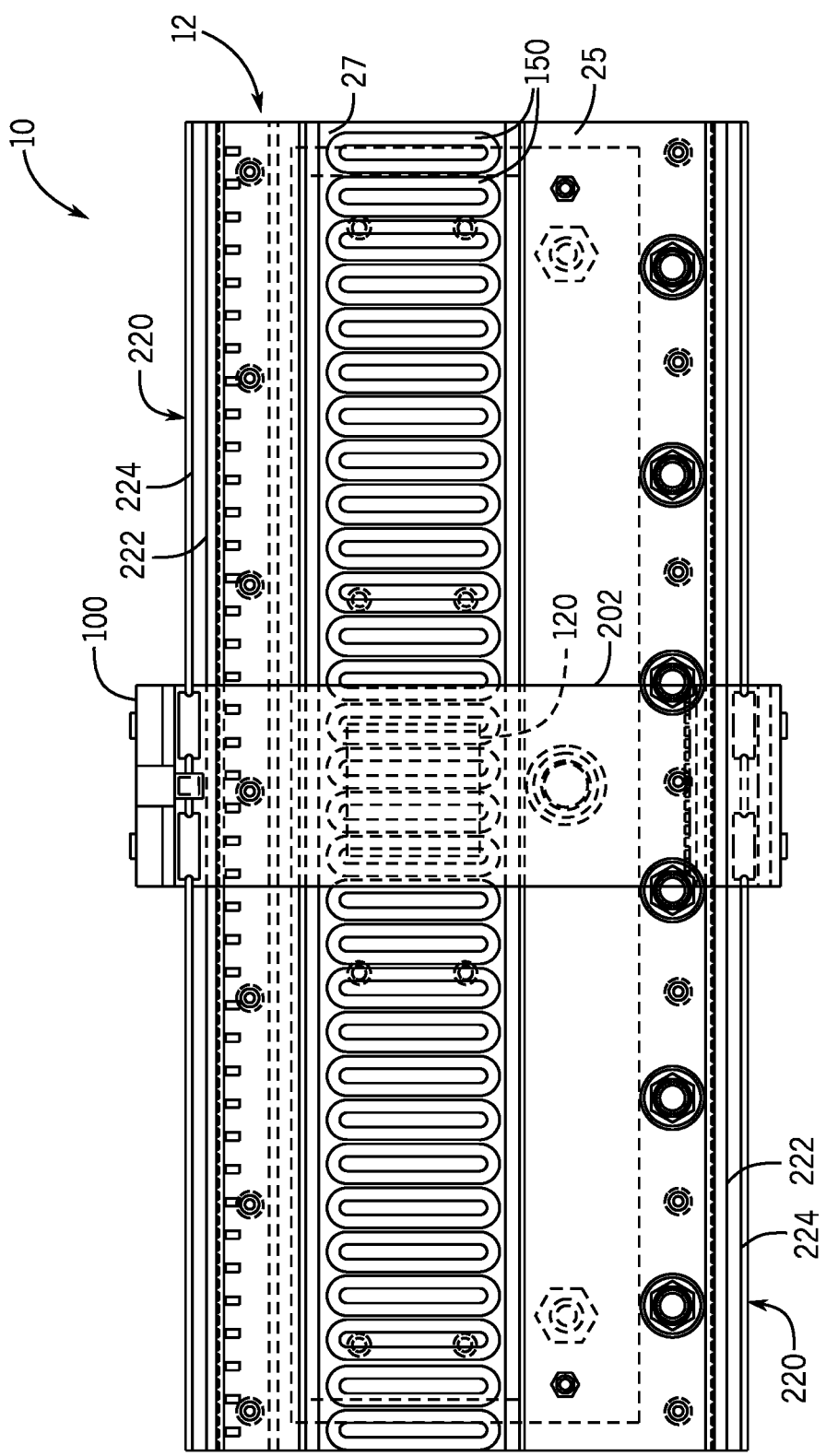
FIG. 9 is a partial side elevation view of one segment of one embodiment of the linear cart system of FIG. 6 illustrating activation coils distributed along one surface of the track segment.

Referring to FIGS. 8 and 9, a linear drive system is incorporated in part on each mover 100 and in part within each track segment 12 to control motion of each mover 100 along the segment. Coils 150 mounted along the length of the track 10 serve as first drive members. Each mover 100 includes a second drive member 120 which is configured to interact with electromagnetic fields generated by the coils 150 to propel the mover 100 along the track 10. It is contemplated that the drive members 120 on each mover 100 may be drive magnets, steel back iron and teeth, conductors, or any other suitable member that will interact with the electromagnetic fields generated by the coils 150. Commonly, the drive member 120 on each mover 100 includes permanent magnets which emit a magnetic field. The magnetic field generated by the drive member 120 on each mover 100 improves the mover interaction with the electromagnetic field generated by the coils 150 in comparison to a magnetically salient structure that has no magnetic field. For convenience, the invention will be discussed with respect to drive magnets 120 being used as the drive member within each mover 100. However, it is understood that the other magnetically salient structures may be employed without deviating from the scope of the invention.

A series of coils 150 are positioned along the length of the track 10. Each mover 100 includes at least one drive magnet 120 configured to interact with an electromagnetic field generated in the coils. Successive activation of the coils 150 establishes a moving electromagnetic field that interacts with the magnetic field generated by each permanent magnet 120 mounted on the movers 100 and that causes the mover 100 to travel along the track 10. Controlled voltages are applied to each coil 150 to achieve desired operation of the movers. The drive magnets 120 are mounted on the inner surface of the side member 202 and when mounted to the track 10 are spaced apart from a series of coils 150 extending along the track 10. As shown in FIG. 8, an air gap 141 is provided between each set of drive magnets 120 and the coils 150 along the track 10. According to the illustrated embodiment, each coil 150 is placed in a channel 27 extending longitudinally along one surface of the track segment 12. The electromagnetic field generated by each coil 150 spans the air gap 141 and interacts with the drive magnets 120 mounted to the mover 100 to control operation of the mover 100.

Figure 2:
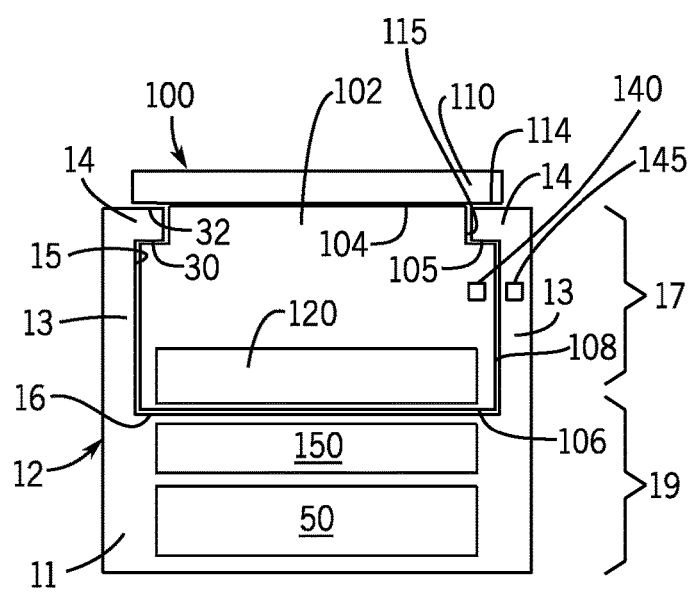
FIG. 2 is a partial sectional view of one embodiment of a mover and track segment included in the independent cart transport system taken at 2-2 of FIG. 1.

According to one aspect of the invention, a segment controller 50 is provided within each track segment 12 to control the linear drive system and to achieve the desired motion of each mover 100 along the corresponding track segment 12. Although illustrated in FIG. 1 as blocks external to the track segments 12, the arrangement is to facilitate illustration of interconnects between controllers. As shown in FIG. 2, it is contemplated that each segment controller 50 may be mounted within the track segment 12. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 10:
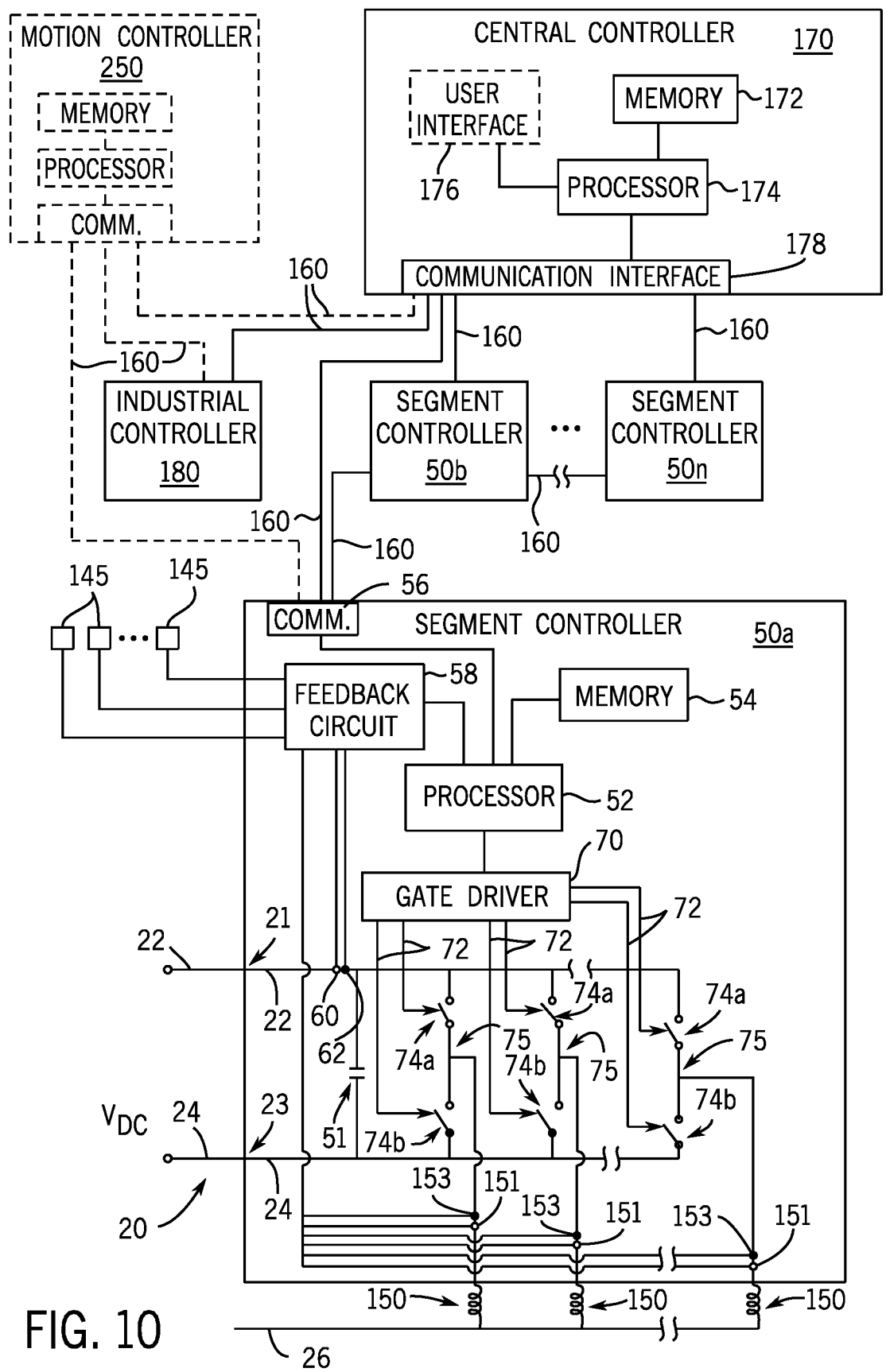
FIG. 10 is a block diagram representation of one embodiment of the exemplary control system of FIG. 1.

With reference also to FIG. 10, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention. In some embodiments, the functions of the central controller 170 may be incorporated within the industrial controller 180, one of the segment controllers 50, or distributed between the industrial controller 180 and/or a combination of the segment controllers 50.

The central controller 170 includes one or more programs stored in the memory device 172 for execution by the processor 174. The central controller 170 receives a desired position from the industrial controller 180 and determines one or more motion profiles for the movers 100 to follow along the track 10. Optionally, a dedicated motion controller 250 is provided to generate motion profiles for the movers 100. In some applications, the central controller 170 and motion controller 250 may operate together where the central controller 170 generates motion profiles for movers 100 operating independently of a robot, and the motion controller 250 generates motion profiles for movers 100 operating in tandem with a robot, R, mounted on the mover 100 or on another mover with which the initial mover must work in tandem. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. According to embodiment illustrated in FIG. 8, the position magnets 140 are positioned in the top member 204 of each mover 100 and sensors 145 are located along the upper surface of each track segment 12. In either embodiment, the sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150 and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately providing positive or negative voltages to one the coils 150.

The power section in each segment controller 50 may include multiple legs, where each leg is connected in parallel between the positive rail 22 and the negative rail 24. According to the embodiment illustrated in FIG. 10, three legs are shown arranged in a half-bridge configuration. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg may also be referred to herein as an upper switch, and the second switching device 74b in each leg may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

Figure 11:
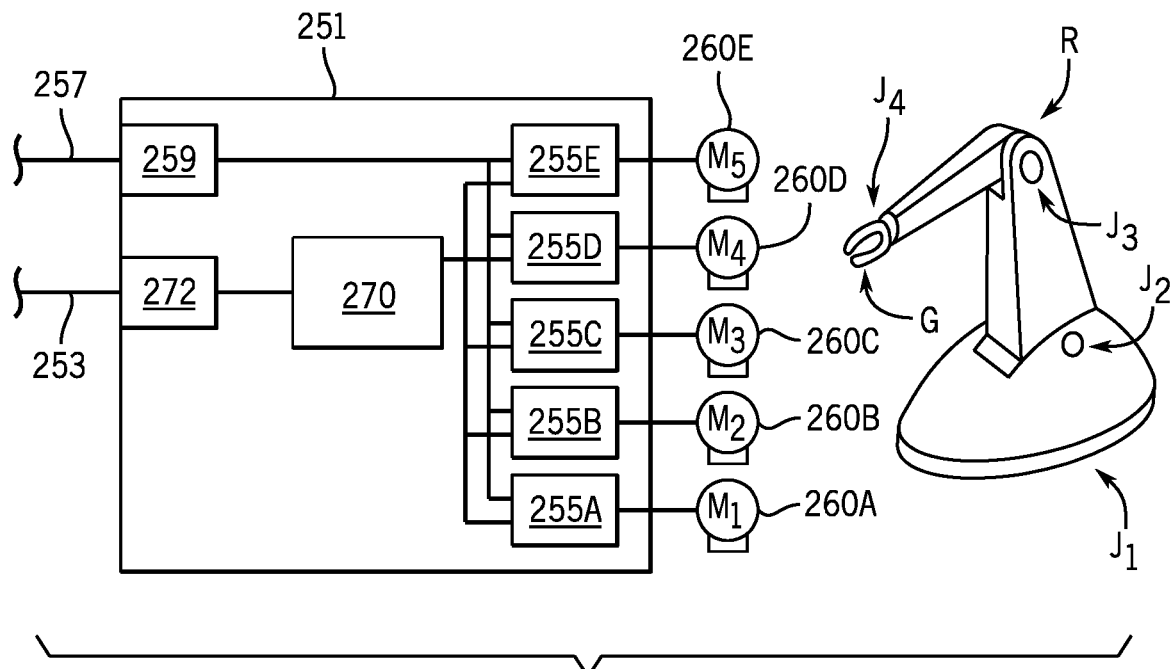
FIG. 11 is a block diagram representation of one embodiment of a robot control system for a robot to be mounted to one of the movers of the independent cart transport system.

Referring again to FIGS. 1 and 6, some applications may have a robot, R, mounted on one or more of the movers 100. A robot, R, is a multi-axis machine having coupling between the different axes. With reference also to FIG. 11, an axis of the robot, R, includes a motor 260 and an inverter 255. The motor 260 may be directly coupled to a mechanical link or, optionally, a gearbox or other drive member may be coupled between the motor 260 and a mechanical link for the robot. The motor 260, inverter 255, and gearbox or other drive member are referred to as a joint, J, of the robot, R. A mechanical link of the robot, R, is a member that spans between two joints, J, of the robot.

Figure 12:
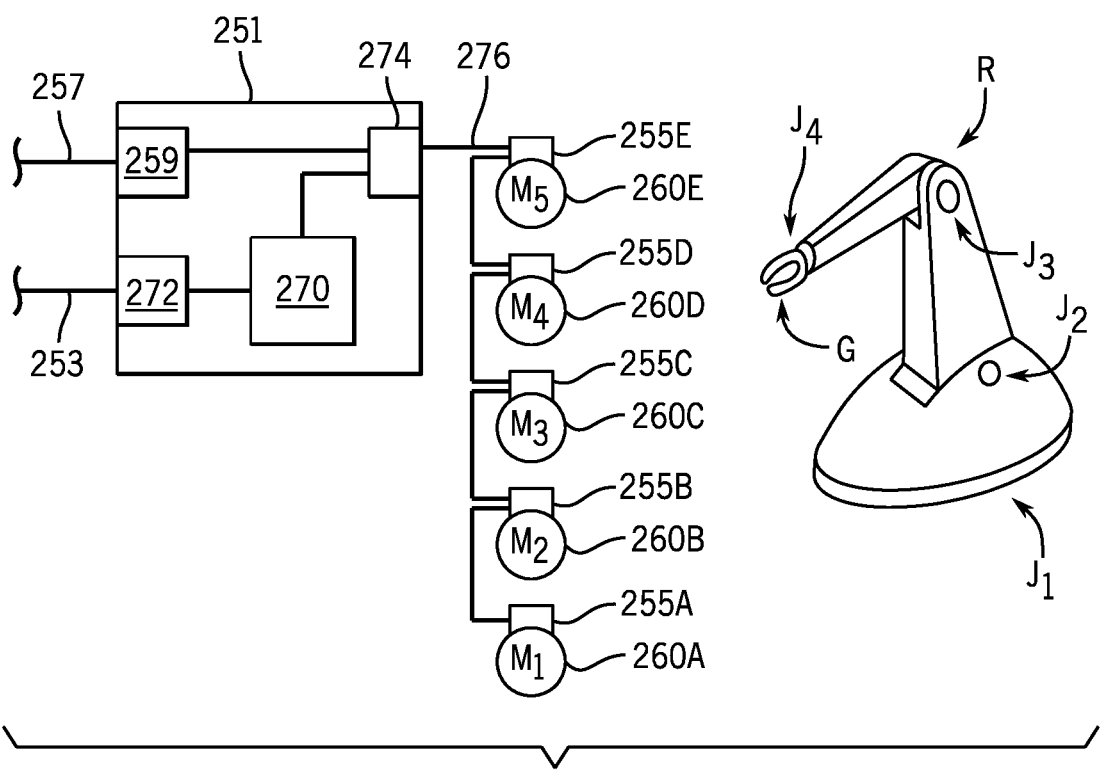
FIG. 12 is a block diagram representation of another embodiment of a robot control system for a robot to be mounted to one of the movers of the independent cart transport system.

Exemplary embodiments for robot control systems are illustrated in FIGS. 11-12. Each robot control system 251 supplies power to and generates control signals for desired operation of the motors 260. According to the illustrated embodiment, each axis of the robot, R, includes one motor 260 and one inverter 255. The illustrated robot, R, includes five motors 260A-260E and five inverters 255E. A first joint, J1, is controlled by a first motor 260A and a first inverter 255A. The first joint, J1, provides rotational motion for a base of the robot, R, with respect to the mover 100 on which it is mounted. A second joint, J2, is controlled by a second motor 260B and a second inverter 255B. The second joint, J2 allows a first arm segment to pivot with respect to the base. A third joint, J3, is controlled by a third motor 260C and a third inverter 255C. The third joint, J3, allows a second arm segment to pivot with respect to the first arm segment. A fourth joint, J4, is controlled by a fourth motor 260D and a fourth inverter 255D. The fourth joint, J4 allows the gripper, G, to rotate with respect to the end of the second arm segment. The robot, R, also includes a gripper, G, controlled by a fifth motor 260E and a fifth inverter 255E. The fifth motor 260E allows the gripper, G, to open and close. For ease of discussion, when a term, such as motor, is referenced generally, the reference numeral 260 will be used by itself. When a particular motor, such as the first motor 260A is referenced, the reference numeral will be used in conjunction with the English letter. It is understood that the description of a single motor 260 or single inverter 255 when referenced without an English letter applies equally to each of the motors 260A-260E or each of the inverters 255A-255E. The illustrated robot, R, is for discussion herein and is not intended to be limiting. It is understood that a robot, R, may have varying numbers of joints configured to pivot, rotate, translate, or the like according to an application's requirements.

Figure 16:
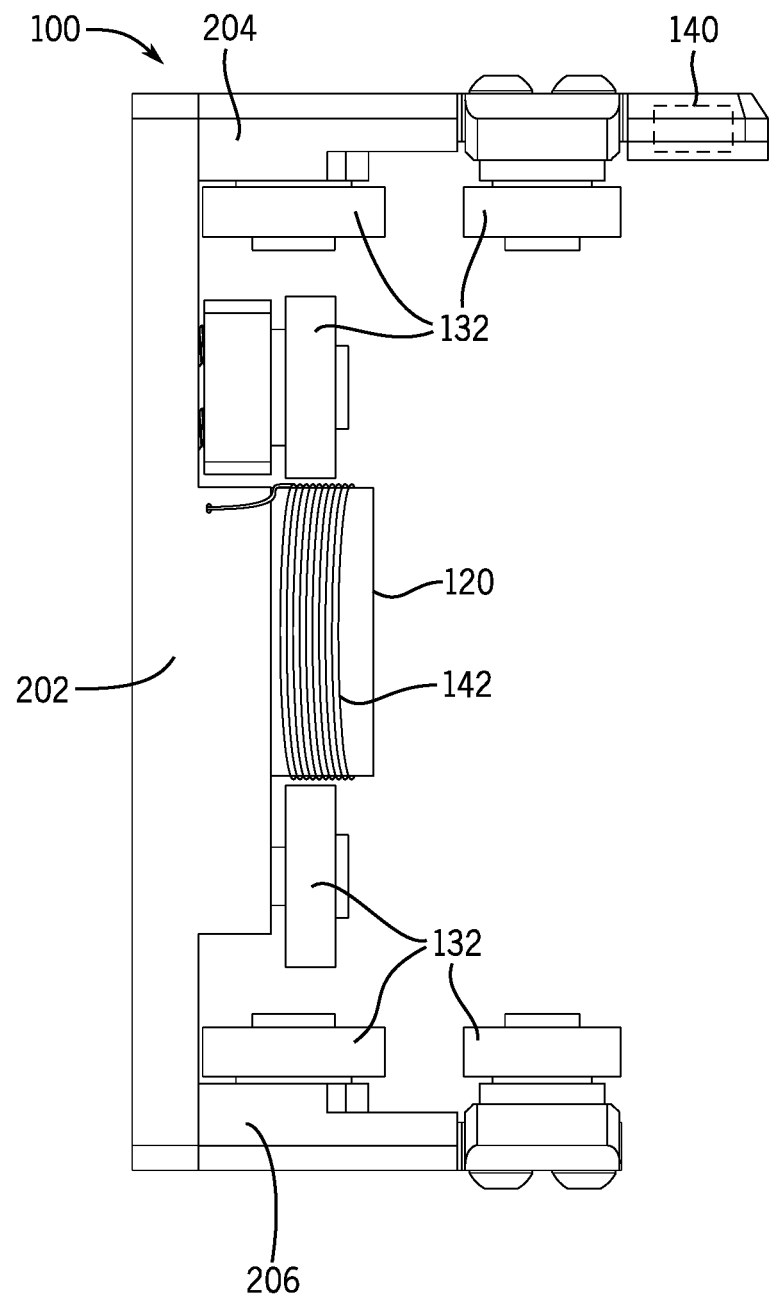
FIG. 16 is a side elevational view of another embodiment of a mover from the transport system of FIG. 6 incorporating one embodiment of contactless power transfer between the track and a mover.

Each of the inverters 255 receives power via a power connection 257. According to one embodiment of the invention, the power connection 257 may be a pick-up coil 142, as shown in FIG. 16. The pick-up coil 142 serves as a secondary coil for wireless power transfer and is configured to receive power via an inductive coupling to a primary coil or a series of primary coils spaced along the track 10. The pick-up coil 142 may operate and wireless power transfer may occur as described in U.S. Pat. No. 10,985,685 entitled System and Method for Wireless Power Transfer in a Linear Cart System. U.S. Pat. No. 10,985,685 is owned by the Assignee of this application and the entire contents of which is incorporated herein by reference. The pick-up coil 142 is connected to a power module 259 on the mover 100. The power module 259 may include a power converter to convert the incoming voltage from AC to DC or from one voltage level to another. The power module 259 may include a battery, capacitor, or other energy storage device within the power module 259. The power module 259 may further include one or more power regulators to supply a desired operating voltage to the motors 255 for the robot, R, or to other devices on the mover 100 according to the application requirements.

Figure 17:
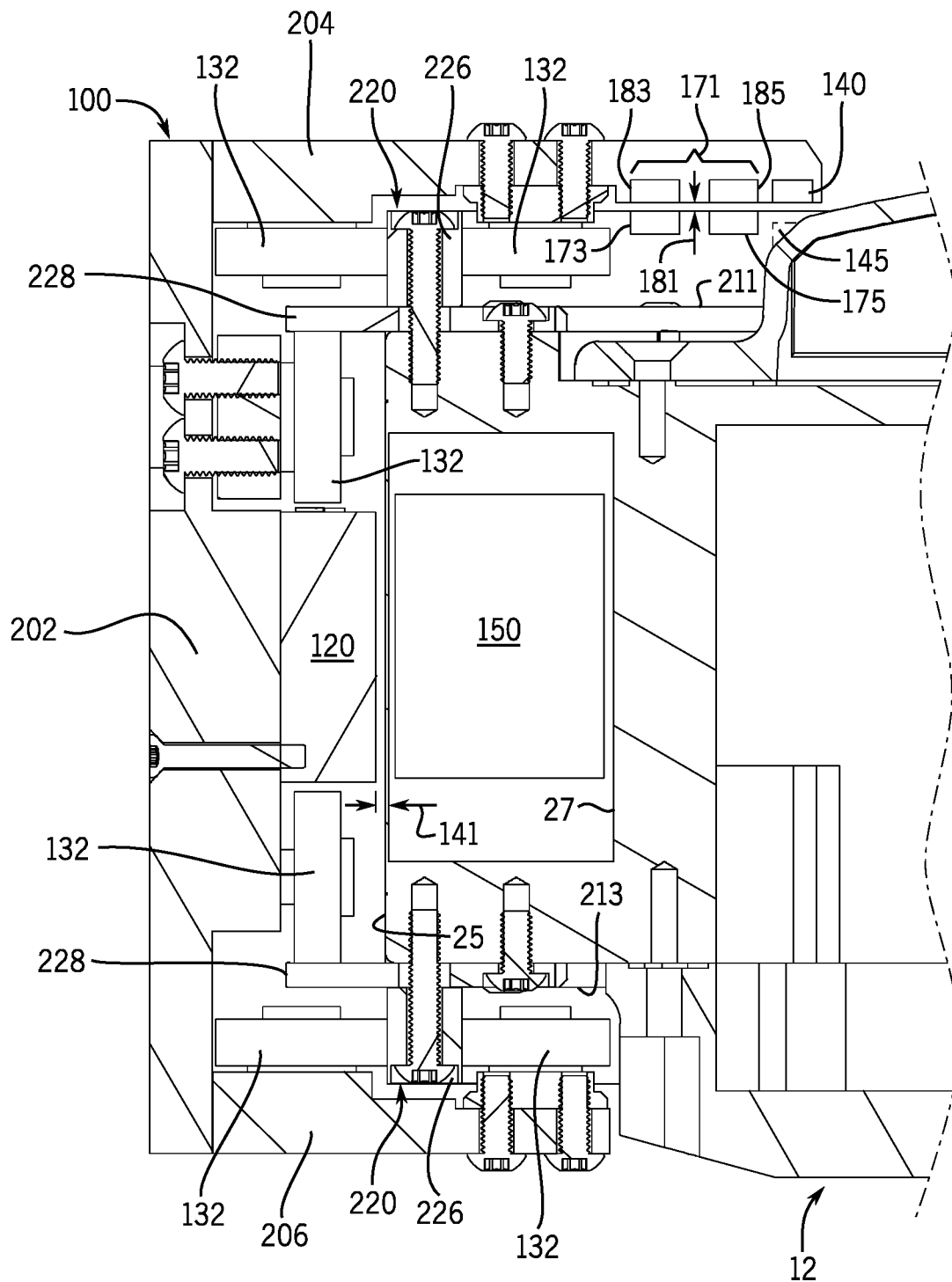
FIG. 17 is a partial sectional view of the transport system of FIG. 6 incorporating another embodiment of contactless power transfer between the track and a mover.

According to another embodiment of the invention, the power connection 257 may be a secondary winding of a sliding transformer 171, as shown in FIG. 17. The sliding transformer 171 provides wireless power transfer between the track 10 and a mover 100. According to the illustrated embodiment, the sliding transformer includes a primary winding having a forward conduction path 173 and a reverse conduction path 175 extending longitudinally along the track 10. The sliding transformer also includes the secondary winding having a forward conduction path 183 and a reverse conduction path 185 extending along the mover 100 in the direction of travel. The secondary winding is spaced apart from the primary winding by an air gap 181. The sliding transformer 171 operates and wireless power transfer may occur as described in U.S. Pat. No. 11,303,242 entitled Method and Apparatus for Wireless Power Transfer to an Independent Moving Cart. U.S. Pat. No. 11,303,242 is owned by the Assignee of this application and the entire contents of which is incorporated herein by reference. The secondary winding may be connected to the power module 259 to provide power on the mover 100 as discussed above.

Figure 13:
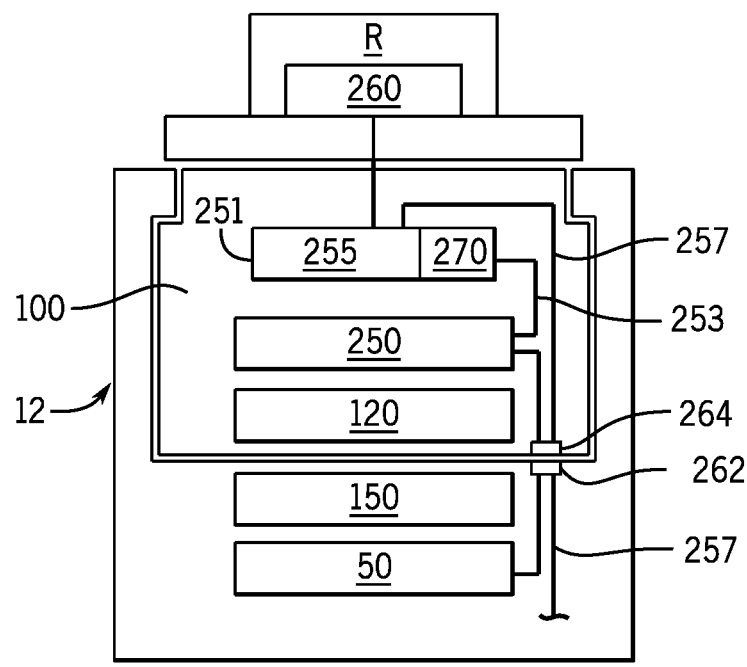
FIG. 13 is a block diagram representation of one embodiment of controllers for the robot control system and for a track segment distributed between a mover and the track segment.
Figure 14:
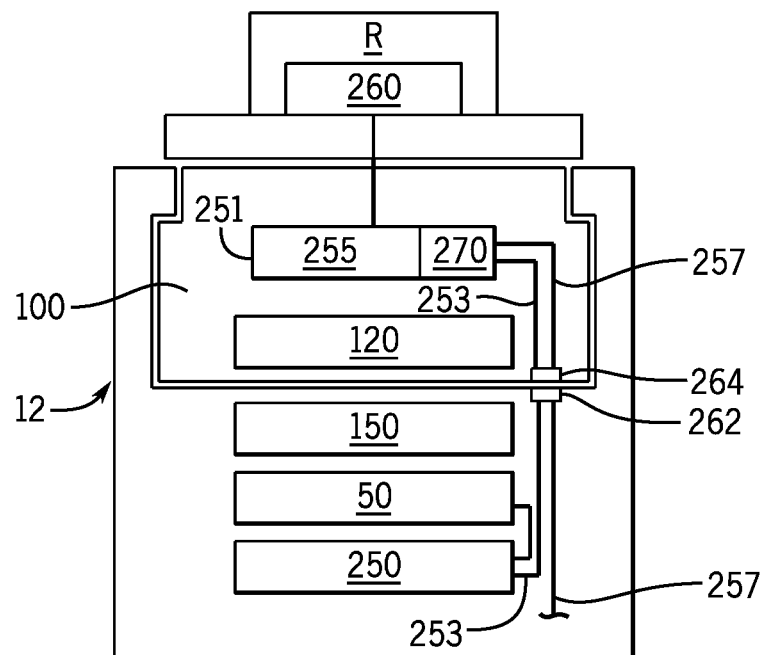
FIG. 14 is a block diagram representation of another embodiment of controllers for the robot control system and for a track segment distributed between a mover and the track segment.
Figure 15:
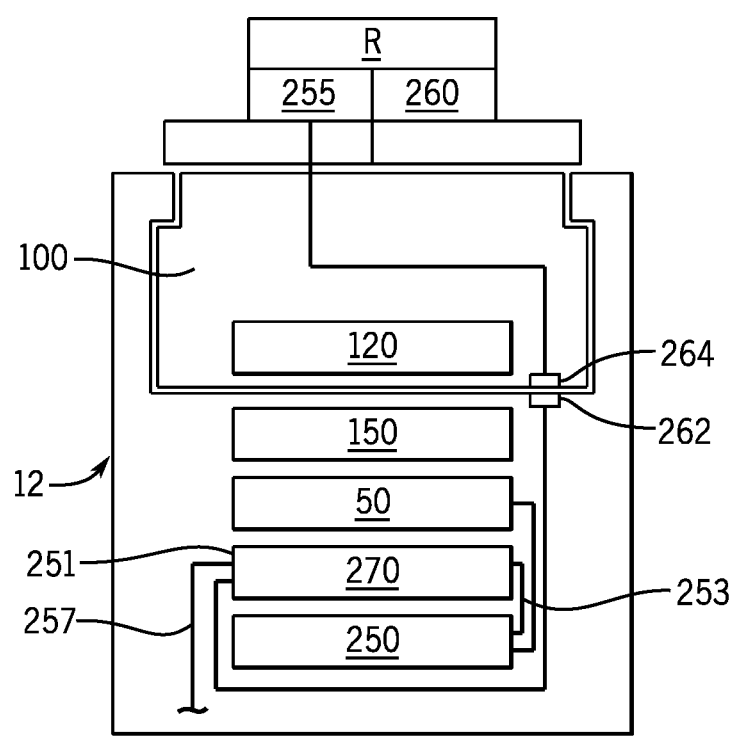
FIG. 15 is a block diagram representation of another embodiment of controllers for the robot control system and for a track segment distributed between a mover and the track segment.

According to still another embodiment of the invention, the power connection 257 may be an electrical cable selectively connected to a power supply external from the mover 100. The mover 100 may be positioned at stations along the track 10. At certain stations, a connector may be provided between the mover 100 and a track segment 12 on which the mover 100 is positioned or between the mover 100 and an actuator adjacent to the track segment 12. With reference also to FIGS. 13-15, the connector includes a first connector segment 262 mounted on the track segment 12 and a second connector segment 264 mounted on the mover 100. According to one aspect of the invention, either the first connector segment 262 or the second connector segment 264 is a plug and the other connector segment is a socket configured to receive the plug. According to another aspect of the invention, the first connector segment 262 and the second connector segment 264 may be two halves of a contactless connector utilizing, for example, near field communications (NFC) between the two connector halves. The first connector segment 262 is positioned at a fixed location along the track 10. The mover 100 is driven to the location such that the second connector segment 264 is aligned with the first connector segment 262. An actuator causes the first connector segment 262 to engage the second connector segment 264, establishing an electrical connection between the two connector segments. In one aspect of the invention, the two connector segments 262, 264 establish a rigid connection, such that the mover 100 remains at the location while the two connector segments 262, 264 are coupled together. In another aspect of the invention, the first connector segment 262 includes a cable, positioned, for example, in a cable tray extending along at least a portion of the track, allowing travel of the mover 100 over a range of positions about the location at which the two connector segments 262, 264 are coupled together. With a cable connected to the first connector segment 262, the mover 100 may travel within the range of the cable while the two connector segments 262, 264 are joined such that the robot, R, in coordination with the mover 100, performs one or more tasks while the connector segments 262, 264 are coupled together. The mover 100 may return to the initial location, the connector segments 262, 264 may be decoupled, and the mover 100 may continue travelling along the track 10.

If the power is supplied by a wired power connection 257, either an AC or a DC voltage may be supplied via the power connection 257. The voltage is provided to the power module 259 on the mover 100. The power module 259 may include a power converter to convert the incoming voltage from AC to DC or from one voltage level to another. The power module 259 may include a battery, capacitor, or other energy storage device within the power module 259. The power module 259 may further include one or more power regulators to supply a desired operating voltage to the motors 255 for the robot, R, or to other devices on the mover 100 according to the application requirements.

With reference again to FIGS. 11 and 12, a controller 270 is provided within each robot control system 251. The controller 270 may include one or more processors configured to execute instructions stored in memory. Optionally, alternate processing devices, such as an application specific integrated circuit (ASIC), field programmable gate array (FPGA), and the like may be configured to execute and/or store instructions for execution of the robot control system 251. Because the robot control system 251 is mounted on a mover 100 it may be desirable to keep the size of the control system compact. A single controller 270 may be configured to generate command signals for each inverter 255, where each inverter 255 receives an input voltage from the power module 259 and regulates the output voltage to control one axis of the robot. In FIG. 11, inverters 255A-255E are mounted separately from the motors 260A-260E. Optionally, and as shown in FIG. 12, integrated inverter modules may be mounted on each motor. According to the embodiment illustrated in FIG. 12, a communication interface 274 receives the power from the power module 259 as well as communication signals from the controller 270. The communication interface 274 may be, for example, a Power over Ethernet (PoE) communication module which modulates the communication signals onto a supply voltage and provides the power and control signals via a PoE cable 276. Each of the integrated inverter modules 255A-255E in FIG. 12 are connected in series and the controller 270 may supply control signals to each of the integrated inverter modules 255A-255E. According to yet another embodiment of the invention (not shown), each inverter module 255A-255E may incorporate its own control section. Each inverter module 255A-255E may then be connected directly to the communication interface 272 and the function of the controller 270 may be performed for each axis on the corresponding inverter module.

The robot control system 251 is in communication with a motion controller 250 via a communication channel 253. A communication interface 272 is provided between the controller 270 and the external communication channel 253. According to one aspect of the invention, the communication channel 253 may provide wireless communication. The communication channel then includes an antenna mounted on the mover 100 in communication with a second wireless communication device remote from the mover 100. Alternately, the communication channel 253 may provide a wired connection. Similar to the wired power connection discussed above, the communication channel 253 may be wired through a connector to the track segment 12 or to an actuator adjacent to the track segment. The connector may be the same connector discussed above with the first connector segment 262 mounted on the track segment 12 and the second connector segment 264 mounted on the mover 100. Optionally, separate connectors may be used for power and for communication. When the mover 100 stops at a station, an actuator on one of the connector segments causes the connector segment(s) to engage, establishing communication between the mover 100 and a controller external to the mover.

According to one aspect of the invention, the motion controller 250 may be a dedicated computation device to determine motion commands for each axis. The motion controller 250 receives a motion command for the robot, R, where the motion command may be a motion trajectory defined in terms of a path of travel for an end of the robot. Alternately, the motion controller 250 may receive a command for the end of the robot, R, to travel between two positions and the motion controller 250 determines the trajectory between the two points. The command may be direct motion between two points or include one or more additional points along the trajectory at which the robot, R, is to pause or pass through. For the illustrated embodiment, motion of the robot is defined based on a desired path for the gripper. Optionally, the gripper may be one tool which is selectively connected to the end of the robot. The motion trajectory may also be defined with respect to the end of the second arm and an offset may be provided as a function of the tool selected by the robot, R. The desired path may be a straight line or a curvilinear path in two or three dimensions between a starting point and an ending point. To travel according to the desired path, each joint of the robot is independently controlled such that the net effect of the robot's motion is to have the point for which the motion trajectory is defined follow the desired path. With reference to FIG. 10, the motion controller 250 may be a separate computing device in communication with one or more of the other controllers in the system via appropriate network media 160. Optionally, the function of the motion controller 250 may be incorporated in whole or in part into one or more of the central controller 170, the industrial controller 180, or segment controller 50 as will be described in more detail below.

The motion controller 250 converts the motion trajectory to a motion command for each joint, J. Motion of one joint, however, will cause each subsequent joint in the robot to move. Motion, for example on the first joint, J1, is rotational with respect to the surface on which the robot is mounted and will cause each of the joints to rotate in space about the axis of rotation of the first joint. Motion on the final joint before the gripper, G, will only affect the position of the gripper. The force applied to any joint, J, will, however, cause each joint in the robot to experience a disturbance as a result of the mechanical linkage between joints. Thus, operation of each joint, J, will have some impact on operation of each other joint in the multi-axis system. When the motion controller 250 is a dedicated computation device, the dedicated computation device may include a complex dynamic model for the robot, R, which may include cross-coupling terms between joints, J, to help compensate for interaction between motors 260. This dynamic model includes complex mathematical computations requiring substantial processing capabilities and, consequently, the need for the dedicated computation device. The dedicated computation device may determine a torque command for each joint, J, and provides the torque commands as an input to the controller 270 for the inverters 255. The controller 270, in turn, generates reference signals for each inverter 255 to obtain desired operation of the corresponding motor 260. According to another aspect of the invention, the motion controller 250 may be implemented in the industrial controller 180. The industrial controller 180 may include a module dedicated to generating motion commands for each axis. Optionally, the processor module 188 may receive the motion command for the robot, R, and determine torque or position reference signals for each axis of the robot.

Turning next to FIG. 13, a first arrangement for the robot control system is illustrated. The robot, R, is shown mounted on the embodiment of the mover 100 shown in FIGS. 1-4. The motors 260 are incorporated into the robot, R. The robot controller 251 and motion controller 250 are each mounted on the mover 100. The motion controller 250 is in communication with and receives the motion command from the segment controller 50 via a connector. According to this embodiment, a single motion controller 250 is provided. With the motion controller 250 mounted on the mover 100, the motion controller can receive position feedback from encoders on the motors 260. The motion controller 250 may receive position feedback signals directly from encoders or indirectly via the inverters 255 controlling operation of the motors 260. The motion controller 250 maintains knowledge of the position of each motor 260 as well as an overall position of the robot, R. In the embodiment of FIG. 13, the motion controller 250 may be incorporated into the robot controller 251 as a single control system mounted on the mover 100.

Turning next to FIG. 14, a second arrangement for the robot control system is illustrated. The robot, R, is again shown mounted on the embodiment of the mover 100 illustrated in FIGS. 1-4 with the motors 260 incorporated into the robot, R. The robot controller 251 is mounted on the mover 100, but the motion controller 250 is mounted remote from the mover 100. Although illustrated within the track segment 12, the motion controller 250 may be external from the track segment 12 and in communication with the segment controller 50. According to one aspect of the invention, a dedicated motion controller 250 may be provided at each station at which the robot, R, is intended to operate. Each motion controller 250 is responsible for control of the robot when the mover 100 is present at the corresponding station. The robot controller 251 receives position feedback information from each inverter 255 and transmits the motor position information to the motion controller 250. The motion controller 250 maintains robot coordinates for each axis and/or for the robot, R, while controlling the robot. The motion controller 250 at one station transmits the coordinates to the other motion controllers 250 upon completion of an action by the robot, such that each motion controller 250 has knowledge of the robot positioning when it begins controlling an action of the robot, R, at its corresponding station. If separate motion controllers 250 are provided at each station, the motion controller 250 may be incorporated into the segment controller 50 for the track segment 12 at the corresponding station.

Alternately, a single motion controller 250 may be provided external from the track or in one of the track segments 12. The motion controller 250 may be a dedicated external processing device. The motion controller 250 may be connected via network medium 160 to one of the segment controllers 50 and, in turn, to the other segment controllers 50. Optionally, the motion controller 250 may be incorporated into one of the segment controllers 50 and in communication with the other segment controllers 50 via the network medium 160 extending between segment controllers. A single motion controller 250 receives position feedback information from the robot, R, via the communication channel 253 to the robot controller 251 mounted on the mover. A single motion controller 250 may continually maintain knowledge of the coordinates of the robot, R, and/or each axis of the robot.

Turning next to FIG. 15, a third arrangement for the robot control system is illustrated. The robot, R, is again shown mounted on the embodiment of the mover 100 illustrated in FIGS. 1-4 with the motors 260 and integrated inverter modules 255 incorporated into the robot, R. The robot controller 251 and the motion controller 250 are both mounted remote from the mover 100. Although illustrated within the track segment 12, the motion controller 250 and/or the robot controller 251 may be external from the track segment 12 and in communication with the segment controller 50. In this embodiment, the motion controller 250 and the robot controller 251 may be separate controllers, incorporated together as a robot control system, or even incorporated into the segment controller 50 as a single control system within a track segment 12 at which the mover 100 stops to perform a task with the robot, R, mounted on the mover. The arrangement illustrated in FIG. 15 is well suited to the PoE configuration shown in FIG. 12. The motion controller 250 is responsible for control of the robot when the mover 100 is present at the corresponding station. The robot controller 251 receives position feedback information from each inverter 255 and transmits the motor position information to the motion controller 250. The motion controller 250 maintains robot coordinates for each axis and/or for the robot, R, while controlling the robot. The motion controller 250 at one station transmits the coordinates to the other motion controllers 250 upon completion of an action by the robot, such that each motion controller 250 has knowledge of the robot positioning when it begins controlling an action of the robot, R, at its corresponding station.

Figure 19:
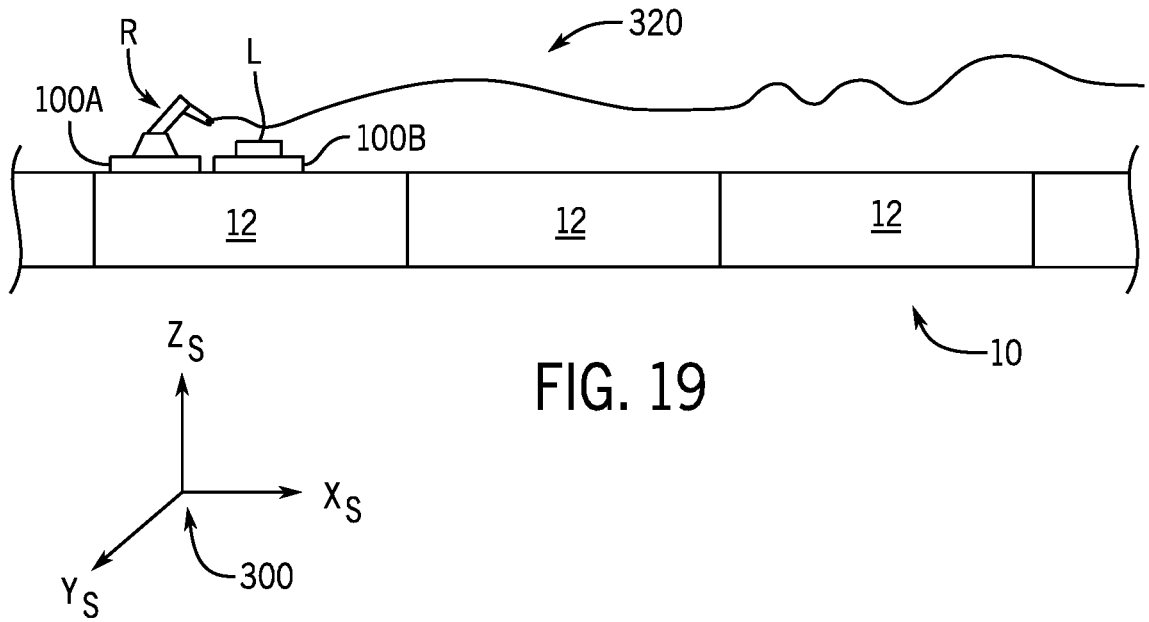
FIG. 19 is a side elevation view of a section of a track for the independent cart transport system of FIG. 1 illustrating an exemplary motion trajectory for a robot mounted on one of the movers.

In operation, the controllers for the independent cart system work together to coordinate motion of the robot, R, present on a mover 100 with the motion of the mover 100 on which the robot is mounted and/or with one or more additional movers in the independent cart system. With reference to FIG. 19, an exemplary trajectory 320 for a robot, R, is illustrated. The trajectory 320 is shown in a stationary coordinate system 300. The stationary coordinate system 300 includes an origin assigned to a fixed reference point with respect to the independent cart system. For ease of illustration, a side elevation view depicts a first mover 100A with a robot, R, mounted on the first mover and a second mover 100B with a load, L, mounted on the second mover. The track 10 and movers 100 are shown in a side elevation view and, therefore, the trajectory 320 is shown in two dimensions, namely varying in the "X" and Z" axes of the stationary coordinate system 300. It is understood that the trajectory 320 may similarly vary along the "Y" axis in tandem or separately with variations in the "X" and "Z" axes.

According to the trajectory 320 for the robot, R, illustrated in FIG. 19, the robot, mounted on a first mover 100A, interacts with the load, L, mounted on the second mover 100B as the two movers 100A, 100B travel along the track 10. Traditionally, a robot is mounted at a fixed location and receives a motion trajectory for the end effector to travel within the reach of the robot. The illustrated trajectory 320 extends along the track 10 and beyond the reach of the robot. The robot, R, therefore, must coordinate motion with the mover 100A on which it is mounted. The motion controller 250 receives the motion trajectory 320 as a command for desired operation of the robot, R. The command may be generated by a control program executing in the industrial controller 180 or via an intermediate controller, such as the central controller 170 for the independent cart system. The motion controller 250, in turn, generates motion commands for individual axes of the robot, R, as well as for the mover 100A on which the robot, R, is mounted. The individual motion commands for the axes and for the mover, when executed in tandem, result in the end effector of the robot, R, following the commanded motion trajectory 320.

Figure 18:
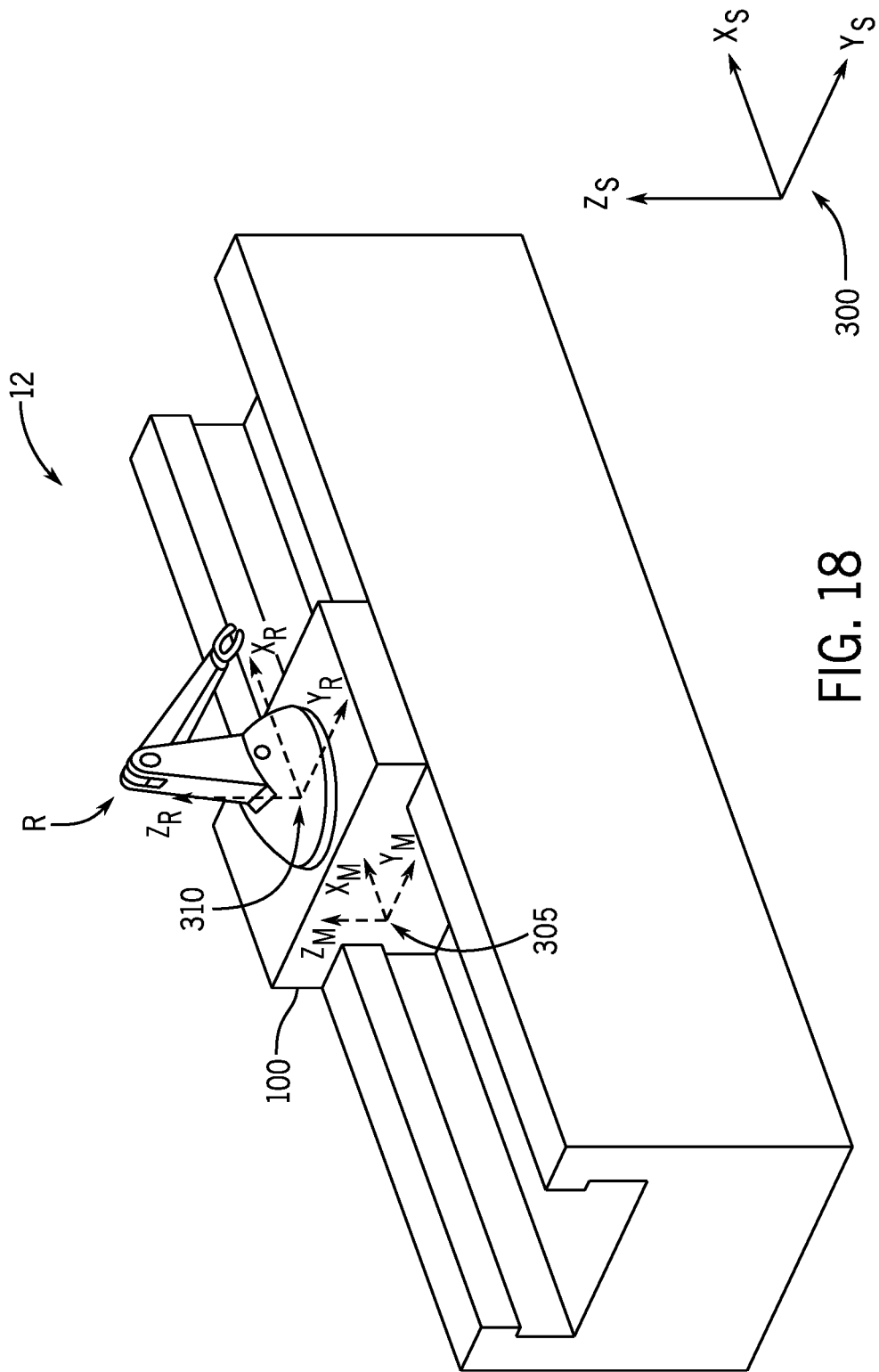
FIG. 18 is a perspective view of one track segment for the independent cart transport system of FIG. 1 with one mover and a robot mounted on the mover illustrating different coordinate systems defined for the control system.

With reference also to FIG. 18, it is contemplated that multiple coordinate systems may be defined for the independent cart system. According to the illustrated embodiment, a first coordinate system is the stationary coordinate system 300. The stationary coordinate system 300 includes an origin assigned to a fixed reference point. The stationary coordinate system 300 includes a set of stationary axes in a Cartesian coordinate, including an x-axis, $X_s$, a y-axis, $Y_s$, and a z-axis, $Z_s$. A second coordinate system is a mover coordinate system 305. The mover coordinate system 305 includes an origin assigned to a fixed point on one of the movers 100. The point may be selected, for example, as a center of gravity of the mover. Optionally, the origin of the mover coordinate system 305 may be assigned to one corner, or to the middle, of the platform 110 for the mover 100. The origin and, therefore, the mover coordinate system 305 travels along with the mover 100. The mover coordinate system 305 includes a set of axes in a Cartesian coordinate, including an x-axis, $X_m$, a y-axis, $Y_m$, and a z-axis, $Z_m$, where the axes travel with the mover. Further, each mover 100 in the independent cart system may be assigned its own mover coordinate system 305. A third coordinate system is a robot coordinate system 310. The robot coordinate system 310 includes an origin assigned to a fixed point with respect to the robot, R. The point may be selected, for example, as a center of the base of the robot, R. The origin and, therefore, the robot coordinate system 310 are stationary with respect to the robot, R. However, since the robot, R, is mounted on a mover 100, the robot coordinate system 310 travels with the mover 100. The robot coordinate system 310 includes a set of axes in a Cartesian coordinate, including an x-axis, $X_R$, a y-axis, $Y_R$, and a z-axis, $Z_R$. Further, each robot, R, operating with the independent cart system may be assigned its own robot coordinate system 310.

As previously indicated, the motion controller 250 is configured to receive a desired trajectory 320 for the robot and generate motion commands for the robot axes and for the mover 100 on which the robot is mounted. The trajectory may be defined by a position matrix, including the X, Y, and Z axes coordinates of a desired position for the robot, R, as the mover 100 travels along the track. The trajectory may be further defined by a rotational matrix, including angle measurements corresponding to the roll, yaw, and pitch of the defined position about the X, Y, and Z axes as well. A desired position for a robot, R, generally, and the end effector more specifically include both a physical location and an orientation as the end effector may be in one position while being oriented to face left, right, up, down, or rotated about three hundred sixty degrees, depending on the robot configuration. The position and/or the rotational matrix are defined in a first coordinate system and provided to the robot controller. The first coordinate system in which the trajectory 320 is defined may be the stationary coordinate system 300 as illustrated in FIG. 19. In order to generate motion commands for the mover 100 and/or the robot, R, the motion controller 250 translates the position and/or rotational information into one or more alternate coordinate systems, such as the mover coordinate system 305 or the robot coordinate system 310. The motion controller 250 then generates individual motion commands for the mover 100 and for each axis of the robot, R, in the corresponding coordinate system. Alternately, the robot motion controller 250 may first generate individual motion commands for the mover 100 and for each axis of the robot, R, in the stationary coordinate system 300. The motion commands for the mover and each axis are then translated into the corresponding coordinate system and provided to a controller for the mover 100 and for each axis.

The segment controller 50 in each track segment 12 is configured to regulate the current to each coil 150 in the corresponding track segment to achieve desired operation of a mover 100 present on the track segment. Consequently, the segment controller 50 for a track segment receives a motion command from the motion controller 250 for each mover 100 present on the corresponding track segment 12. The segment controller 50 then controls operation of the mover responsive to the motion command for the mover 100. The segment controller 50 receives the position feedback information from the position sensors 145 spaced along the corresponding track segment 12 to determine the location of the mover 100 on the track segment. The segment controller 50 uses the position information to control desired operation of the mover 100 and may additionally transmit the position information to the motion controller 250 so the motion controller 250 may track desired operation of the mover 100 in tandem with motion of the robot, R.

The robot control system 251 on the mover 100 or present at a station is configured to control operation of the motors 260 for each axis of the robot, R. Consequently, the robot control system 251 receives the motion commands for each axis of the robot, R, from the motion controller 250. The controller 270 generates commands for each inverter 255 corresponding to the motion commands. The controller 270 receives position feedback from encoders mounted on each motor 260 to monitor the position of each motor. In some embodiments, the robot, R, may have an encoder coupled to the mechanical link between axes. The encoder may be redundant to, or be an alternate to, the encoder on the motor 260. The controller uses the position information to control desired operation of each axis and may additionally transmit the position information to the motion controller 250 so the motion controller 250 may track desired operation of the robot, R, in tandem with motion of the mover 100.

The motion controller 250 is configured to track position information from the mover 100 and from each axis of the robot, R, to follow the commanded motion trajectory 320. The motion controller 250 may close a loop on the position feedback and adapt the motion commands to the mover 100 and/or to each axis in response to the current position of the end effector of the robot, R, in comparison to the commanded position. The motion controller 250, therefore, coordinates motion of the mover 100 and the robot, R, mounted on the mover 100 to achieve desired operation of the robot.

According to another aspect of the invention, the motion controller 250 may be configured to coordinate operation of the robot, R, with multiple movers 100 in the independent cart system. With reference to FIG. 19, the robot, R, is mounted on a first mover 100A and interacts with the load, L, mounted on the second mover 100B as the two movers 100A, 100B travel along the track 10. In this application, the motion controller may also receive position information for the second mover 100B as well as the first mover 100A. The segment controller 50 for the track segment 12 on which each mover 100 is located transmits the position of the corresponding mover to the motion controller 250. A precise relationship between the end effector of the robot, R, and the load may need to be maintained in addition to the robot, R, following a desired motion trajectory 320. The motion controller 250 generates motion commands for the first mover 100A as a function of the motion trajectory 320 and, in turn, generates motion commands for the second mover 100B as a function of the desired relationship between the first and second movers 100A, 100B or as a function of the desired relationship between the end effector of the robot on the first move and the load on the second mover. As the movers 100A, 100B travel along the track, the motion controller 250 tracks position information from each mover 100A, 100B and from each axis of the robot, R, to follow the commanded motion trajectory 320 and maintain the desired relationship between movers. The motion controller 250 may close a loop on the position feedback and adapt the motion commands to each mover 100 and/or to each axis in response to the current position of the robot, R, and of the movers in comparison to the commanded position.

Figure 20:
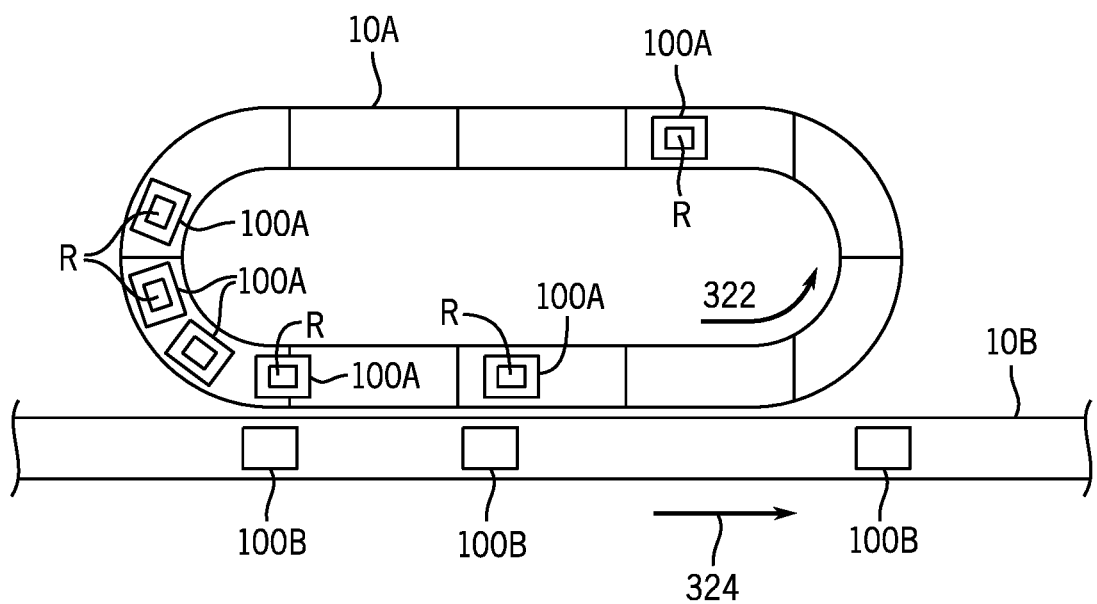
FIG. 20 is a top plan view of a pair of tracks positioned adjacent to each other for another exemplary independent cart transport system.

With reference also to FIG. 20, the first mover 100A and the second mover 100B may be located on separate tracks 10A, 10B. According to the illustrated embodiment, a first track 10A is configured in an oval with multiple movers 100A present along the first track 10A. Each of the first movers 100A includes a robot, R, mounted on the mover. A second track 10B extends past the first track 10A in a straight line. The second track 10B includes multiple movers 100B travelling along the track in a direction noted by arrow 324. As the second movers 100B on the second track 10B pass the first track 10A, the second track 10B and the second movers 100B are close enough to the first track 10A such that the robots, R, mounted on each of the first movers 100A can reach the second mover 100B or a load present on the second mover. The industrial controller 180 may be configured to control both tracks 10A, 10B. Optionally, a first industrial controller 180 may be configured to control the first track 10A, a second industrial controller 180 may be configured to control the second track 10B, and the two industrial controllers are in communication with each other. When a second mover 100B is ready to pass the first track 10A, a first mover 100A is positioned to travel along with the second mover 100B. The first mover 100A travels in the direction noted by arrow 322 as the second mover 100B passes the first track 10A and returns to the queue to travel with a subsequent mover. It is contemplated that each second mover 100B may require a first mover 100A to travel in tandem. Alternately, only a portion of the second movers 100B may require a first mover 100A as a function, for example, of the load present or whether a load is present on the second mover 100A. According to still another aspect, the second mover 100B may include a load requiring multiple first movers 100A to act on the load. Each of the first and second movers 100A, 100B required according to an application's requirements may move in tandem along the first and second tracks 10A, 10B, and the robot(s), R, present on the first mover(s) 100A receives a commanded trajectory to operate on the load present on the second mover 100B or directly on the second mover 100B as the movers travel along the track.

Similar to the embodiment illustrated in FIG. 19, a precise relationship between the two movers 100A, 100B is desired. For example, it may be desired that the two movers 100A, 100B travel synchronously next to each other for at least a portion of the distance that the second track 10B is adjacent to the first track 10A. The motion controller 250 generates motion commands for the first mover 100A as a function of the motion trajectory 320 and, in turn, generates motion commands for the second mover 100B as a function of the desired relationship between the first and second movers 100A, 100B. As the movers 100A, 100B travel along the track, the motion controller 250 tracks position information from each mover 100A, 100B and from each axis of the robot, R, to follow the commanded motion trajectory 320 and maintain the desired relationship between movers. The motion controller 250 may close a loop on the position feedback and adapt the motion commands to each mover 100 and/or to each axis in response to the current position of the robot, R, and of the movers in comparison to the commanded position.

Figure 21:
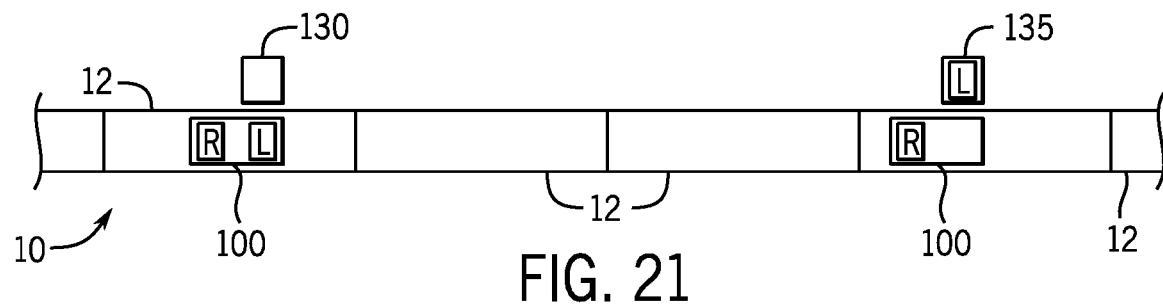
FIG. 21 is a top plan view of an exemplary independent cart transport system with a load station and an unload station illustrating a robot loading a load onto the same mover as the robot.
Figure 22:
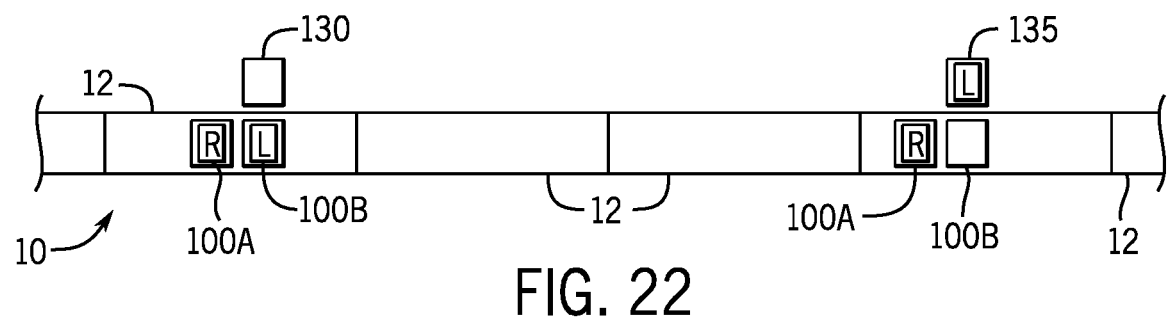
FIG. 22 is a top plan view of an exemplary independent cart transport system with a load station and an unload station illustrating a robot loading a load onto a different mover as the robot.

Turning next to FIGS. 21 and 22, the robot, R, may be configured to interact with a single mover 100 or in combination with multiple movers. FIGS. 21 and 22 each illustrate a robot, R, configured to pick up a load, L, from a load station 130. The load, L, is then transported along the track 10 to an unload station 135. The robot, R, is configured to similarly drop off the load, L, at the unload station 135. In certain applications, the robot, R, may additionally be configured to interact with the load, L, as the mover 100, or movers, are travelling between the load station 130 and the unload station 135.

With reference first to FIG. 21, two movers 100 are illustrated. A first mover 100 is positioned proximate the load station 130. The robot, R, has transferred the load, L, to the same mover 100 on which the robot, R, is mounted. A second mover 100 is positioned proximate the unload station 135. The robot, R, has transferred the load, L, from the second mover 100 to the unload station 135. In one aspect of the invention, the figure may illustrate a single mover at two different operating positions along the track 10. In another aspect of the invention, multiple movers 100 may each have a robot, R, mounted on the mover and travel along the track. The figure may illustrate a first mover 100 present by the load station 130 and a second mover 100 present by the unload station 135. Still other numbers of movers 100 may be present on the track where either a portion of the movers 100 or all of the movers included robots mounted on the mover.

According to another aspect of the invention, the motion controller 250 may receive a single trajectory command for the robot, R, to perform a complete cycle of operations including, for example, loading the load, L, on to the mover 100 from the load station 130; acting on the load, L, as the mover 100 travels between the load station 130 and the unload station 135; and unloading the load, L, from the mover 100 at the unload station 135. The mover 100 may be configured to come to a complete stop at the load station 130 and/or the unload station 135. Optionally, the mover 100 may continue travelling along the track past the load and unload stations as the robot, R, picks up and drops off the load, L, respectively. Further, desired action of the mover 100 may be included in the motion trajectory 320 provided to the motion controller 250. The motion controller 250 receives the motion trajectory and generates a mover command for the mover 100. The motion controller 250 transmits the mover command to a segment controller 50 corresponding to the track segment 12 on which the mover 100 is presently located. The motion controller 250 also generates a robot motion command and transmits the robot motion command to the robot controller 251. The robot controller 251 and the segment controller 50 operate in tandem to achieve desired operation of the robot, R, and mover 100 at the load station 130, the unload station 135, and during travel between the stations.

In another aspect of the invention, the motion controller 250 may receive multiple motion trajectory commands for the robot, R. For example, a first motion trajectory command may control the robot, R, and/or mover 100 at the load station 130 to transfer the load, L, from the load station 130 to the mover 100. A second motion trajectory command may control the robot, R, and mover 100 between the load station 130 and the unload station 135. A third motion trajectory command may control the robot, R, and/or mover 100 at the unload station 135 to transfer the load, L from the mover 100 to the unload station 135.

With reference next to FIG. 22, two pairs of movers 100A, 100B are illustrated. A first mover 100A carries the robot, R, and a second mover 100B carries the load, L. The first pair of movers 100A, 100B is positioned proximate the load station 130. The robot, R, has transferred the load, L, to the second mover 100B. A second pair of movers 100A, 100B is positioned proximate the unload station 135. The robot, R, has transferred the load, L, from the second mover 100B to the unload station 135. In one aspect of the invention, the figure may illustrate a single pair of movers 100A, 100B at two different operating positions along the track 10. In another aspect of the invention, multiple pairs of movers 100A, 100B may each have a robot, R, mounted on the first mover 100A and a second mover 100B configured to receive the load, L. Still other pairs of movers 100A, 100B or individual movers 100 may be present on the track.

According to another aspect of the invention, the motion controller 250 may receive a single trajectory command for the robot, R, to perform a complete cycle of operations including, for example, loading the load, L, on to the second mover 100B from the load station 130; acting on the load, L, as the pair of movers 100A, 100B travels between the load station 130 and the unload station 135; and unloading the load, L, from the second mover 100B at the unload station 135. The pair of movers 100A, 100B may be configured to come to a complete stop at the load station 130 and/or the unload station 135. Optionally, the pair of movers 100A, 100B may continue travelling along the track past the load and unload stations as the robot, R, picks up and drops off the load, L, respectively. Further, desired action of the movers 100A, 100B may be included in the motion trajectory 320 provided to the motion controller 250. The motion controller 250 receives the motion trajectory and generates a first mover command for the first mover 100A and a second mover command for the second mover 100B. In some instances, the first mover command and the second mover command may be identical, causing the first mover 100A and the second mover 100B to drive synchronously along the track 10. In other instances, the first mover 100A may serve as an additional axis of the robot, R, and may change speed with respect to the speed of the second mover 100B such that a position between the two movers 100A, 100B varies during travel along the track, wherein the varying distance between the movers 100A, 100B aids in positioning the end effector of the robot, R, at a desired position with respect to the load, L, on the second mover 100B. The motion controller 250 transmits the first mover command to a segment controller 50 corresponding to the track segment 12 on which the first mover 100A is presently located and transmits the second mover command to a segment controller 50 corresponding to the track segment 12 on which the second mover 100B is presently located. At some positions along the track 10, the segment controller 50 for the first and second movers 100A, 100B may be the same. At other positions along the track 10, the segment controllers 50 for the first and second movers 100A, 100B may be located on adjacent track segments 12. The motion controller 250 also generates a robot motion command and transmits the robot motion command to the robot controller 251. The robot controller 251 and the segment controllers 50 operate in tandem to achieve desired operation of the robot, R, and movers 100A, 100B at the load station 130, the unload station 135, and during travel between the stations.

In another aspect of the invention, the motion controller 250 may receive multiple motion trajectory commands for the robot, R. For example, a first motion trajectory command may control the robot, R, and/or movers 100A, 100B at the load station 130 to transfer the load, L, from the load station 130 to the second mover 100B. A second motion trajectory command may control the robot, R, and movers 100A, 100B between the load station 130 and the unload station 135. A third motion trajectory command may control the robot, R, and/or movers 100A, 100B at the unload station 135 to transfer the load, L from the second mover 100B to the unload station 135.

Figure 23:
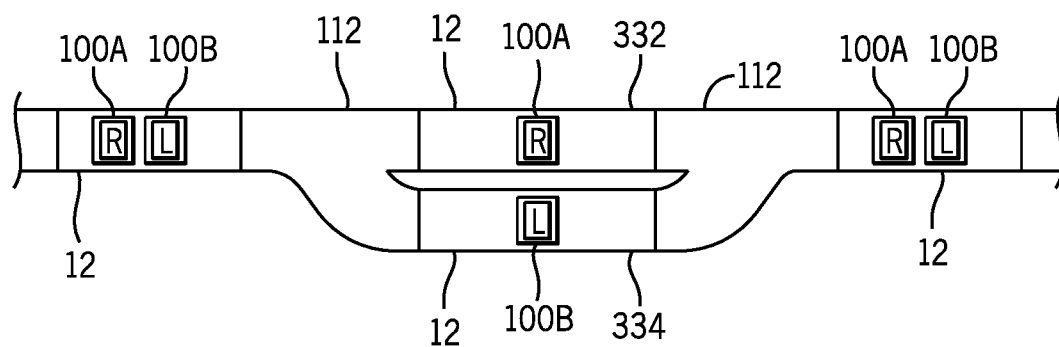
FIG. 23 is a top plan view of an exemplary independent cart transport system with a switch track segment and parallel tracks extending for a portion of the track.

Turning next to FIG. 23, the track 10 may include one or more switch track segments 112 to selectively route a mover 100 between multiple paths along the track. The switch track segments 112 are also referred to as a merge track segment, where the switch track segment 112 includes two track segments entering and one track segment exiting the switch track segment, or a diverge track segment, where the switch track segment 112 includes a single track segment entering and two track segments exiting the switch track segment. According to the embodiment illustrated in FIG. 23, the movers 100 travel from left-to-right. The illustrated track 10 includes a first track segment 12 entering a diverge track segment 112. The diverge track segment 112 divides the track into a main track segment 332 and a parallel track segment 334. Although each of the main track segment 332 and the parallel track segment 334 include a single track segment 12, the two track segments may be of any suitable length and varying numbers of track segments according to the application requirements. A merge track segment 112 is connected to both the main track segment 332 and the parallel track segment 334 to merge the two track segments back into a single path along a final illustrated track segment 12.

As shown in FIG. 23, three pairs of movers 100A, 100B are illustrated. The three pairs of movers 100A, 100B may be a single pair of movers illustrated at three different operating points or may be multiple pairs of movers present in tandem along the track. The first pair of movers 100A, 100B include a first mover 100A, on which the robot, R, is mounted, travelling in tandem with a second mover 100B, on which a load is mounted. As the movers 100A, 100B reach the switch track segment 112 at which the track diverges, one of the two movers from the pair of movers 100A, 100B follows the main track segment 332 and the other mover, from the pair of movers 100A, 100B, follows the parallel track segment 334. According to the illustrated embodiment, the first mover 100A follows the main track segment 332, and the second mover 100B follows the parallel track segment 334. As the two movers 100A, 100B travel along the main and parallel track segments 332, 334, the speed of either the first mover 100A or the second mover 100B may be adjusted such that the two movers 100A, 100B are positioned adjacent to each other on the two track segments 332, 334. With the second mover 100B adjacent to the first mover 100A, the robot, R on the first mover is configured to engage the load, L, mounted on the second mover 100B. The two movers 100A, 100B may temporarily stop along the parallel tracks. Alternately, the two movers 100A, 100B are controlled in tandem to travel synchronously next to each other. The movers 100A, 100B may continue travelling at the same speed as they travelled along the initial track segment or at a different speed, such as a reduced speed, along the parallel track segments. According to still another option, the two movers 100A, 100B may travel in tandem along the parallel track segments, but the speed of the two movers 100A, 100B may vary with respect to each other such that the first mover 100A serves as an additional axis of the robot, R, and aids in positioning the end effector of the robot with respect to the load, L, on the second mover 100B. While the two movers 100A, 100B are position on the parallel tracks, the motion controller 250 receives a command for desired operation of the robot, R, and issues motion commands to the segment controllers 50 for the track segments on which the movers 100A, 100B are positioned and issues motion commands to the robot controller 251 to control the various axes of the robot. When the desired operation of the robot, R, is complete, the first mover 100A may slow down or the second mover 100B may speed up as the two movers 100A, 100B reach a second switch track segment 112 at which the two paths merge. The two movers 100A, 100B merge again onto a single track segment 12 and are again positioned one in front of the other as they continue travelling along the track 10.

Figure 24:
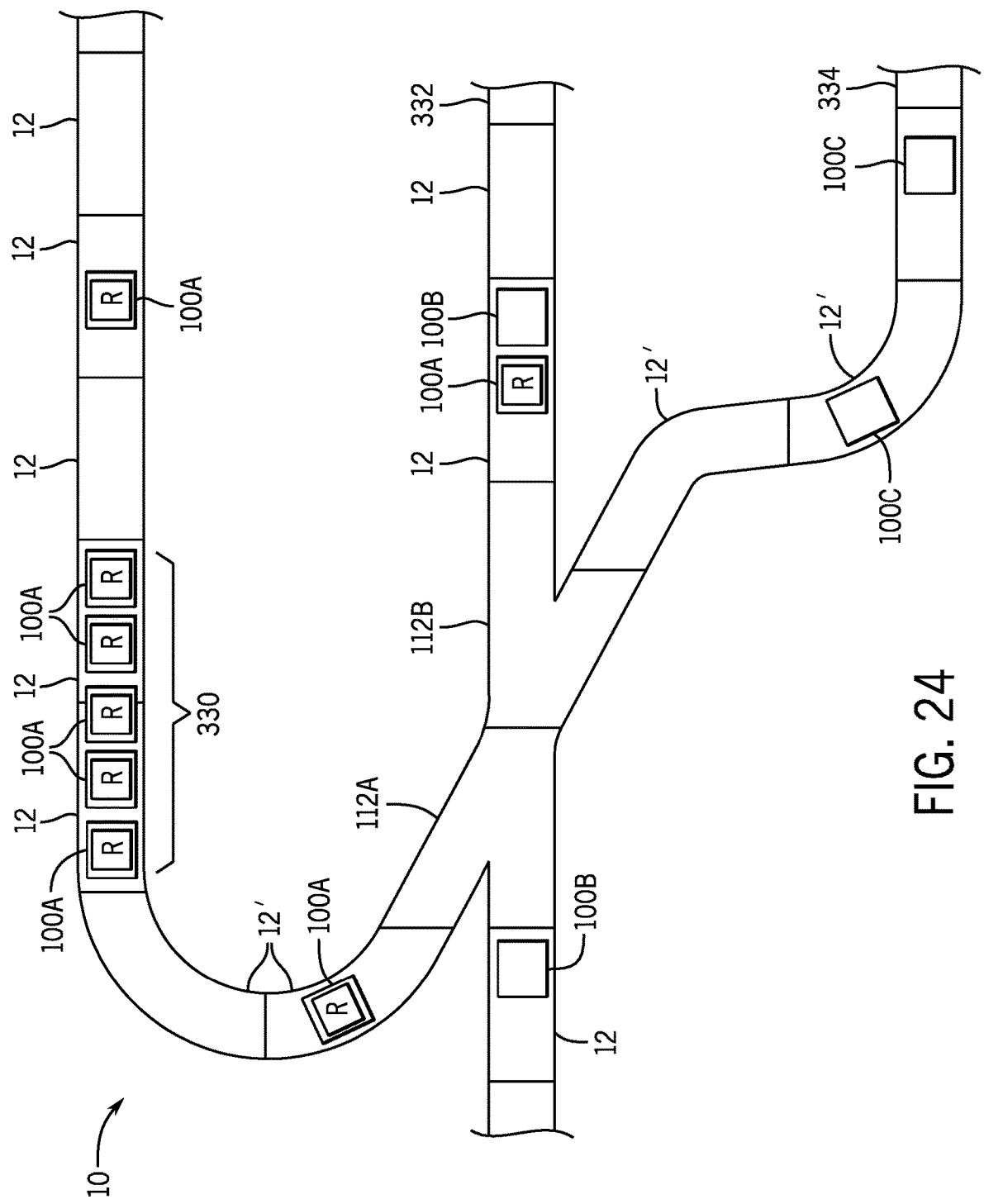
FIG. 24 is a top plan view of an exemplary independent cart transport system with a queueing track, multiple switches, and parallel track segments.

Turning next to FIG. 24, the independent cart system may include a robot queuing segment 330 along the track. A main track section 332 is shown at the leftmost side of FIG. 24 approaching a first switch track segment 112A. The first switch track segment 112A is a merge segment connecting the queueing segment 330 to the main track section 332. A second switch track segment 112B is connected after the first switch track segment 112A, where the second switch track segment 112B is a diverge segment. The main track section 332 continues straight across the illustrated system and a parallel track section 334 also exits the diverge segment. The independent cart system shown in FIG. 24 includes multiple first movers 100A, where each first mover 100A has a robot, R, mounted on the mover. In the illustrated embodiment, a first portion of the other movers 100 require interaction with a robot, R, while a second portion of the other movers 100 do not require interaction with a robot. The first portion of the other movers 100 are illustrated as second movers 100B, and the second portion of the other movers 100 are illustrated as third movers 100C.

As the other movers 100 approach the first switch track, the industrial controller 180 may be configured to determine whether a robot, R, is required to interact with the mover. When the approaching mover 100 does require interaction with a robot, R, a first mover 100A is launched from the queuing track section 330. The first mover 100A may be commanded to merge with the main track section 332 either in front of or behind the second mover 100B, such that the robot, R, is able to engage the second mover 100B or to engage a load, L, present on the second mover 100B. When the approaching mover 100 does not require interaction with a robot, R, the mover 100 is commanded through the switch segments 112 as a third mover 100C and no robot, R, is sent to engage the third mover 100C. Whether a mover 100 requires interaction with a robot, R, may depend, for example, on whether a load, L, or a particular type of load is present on the mover.

According to the illustrated embodiment, second movers 100B and the corresponding first mover 100A travel along the main track segment 332 for subsequent interaction of the robot, R, with the second mover 100B. A motion controller 250 may generate motion profiles for the first mover 100A, second mover 100B, and robot, R, as discussed above. When the desired interaction of the robot, R, with the second mover 100B is complete, the first mover 100A is commanded to diverge from the main track segment 332 and return to the queueing track section 330. Third movers 100C are illustrated as being diverted to the parallel track segment 334. The third movers 100C may be commanded via move commands generated by the industrial controller 180, central controller 170, or segment controller 50 according to the application requirements. The illustrated embodiment is intended to be exemplary and not limiting. The second movers 100B and third movers 100C may both continue down a single track segment or a portion of each of the first and second movers may be diverted to different track segments.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for coordinating motion of a robot with an independent cart system, the independent cart system including a track and a plurality of movers configured to travel along the track, wherein the track includes a plurality of track segments and each of the plurality of track segments includes a segment controller, the method comprising the steps of:

positioning a first mover for the independent cart system at a load position, where the robot is mounted on the first mover;

receiving a first motion trajectory command for the robot at a robot motion controller;

loading a load on a second mover for the independent cart system with the robot following the first motion trajectory command;

generating a first mover command for the first mover;

generating a second mover command for the second mover, wherein the first and second mover commands cause the first mover and the second mover to travel together along the track;

positioning the first mover at an unload position;

receiving a second motion trajectory command for the robot at the robot motion controller; and unloading the load from the second mover for the independent cart system with the robot following the second motion trajectory command, wherein:

either the first motion trajectory command or the second motion trajectory command incorporates motion of the first mover;

when the first motion trajectory command incorporates motion of the first mover, the method further comprises the steps of:

generating a first mover motion command with the robot motion controller responsive to receiving the first motion trajectory command, transmitting the first mover motion command to the segment controller for a first track segment, wherein the first mover is located on the first track segment, controlling motion of the first mover with the segment controller for the first track segment as the robot is loading the load on the second mover, and controlling motion of the second mover with the segment controller for a second track segment as the robot is loading the load on the second mover, wherein the second mover is located on the second track segment; and when the second motion trajectory command incorporates motion of the first mover:
generating a second mover motion command for the first mover with the robot motion controller responsive to receiving the second motion trajectory command,
transmitting the second mover motion command to the segment controller for the first track segment,
controlling motion of the first mover with the segment controller for the first track segment as the robot is unloading the load from the second mover, wherein the first mover is located on the first track segment, and
controlling motion of the second mover with the segment controller for the second track segment as the robot is unloading the load from the second mover, wherein the second mover is located on the second track segment.

2. The method of claim 1, wherein:
the first mover and the second mover are both located on one of the plurality of track segments as the robot is loading the load on the second mover, and
the first track segment is the same as the second track segment.

3. The method of claim 1, wherein:
the first mover and the second mover are both located on one of the plurality of track segments as the robot is unloading the load from the second mover, and
the first track segment is the same as the second track segment.

4. A method for coordinating motion of a robot with an independent cart system, the independent cart system including a track and a plurality of movers configured to travel along the track, wherein the track includes a plurality of track segments and each of the plurality of track segments includes a segment controller, the method comprising the steps of:
positioning a first mover for the independent cart system at a load position, where the robot is mounted on the first mover;
receiving a first motion trajectory command for the robot at a robot motion controller;
loading a load on a second mover for the independent cart system with the robot following the first motion trajectory command;
generating a first mover command for the first mover;
generating a second mover command for the second mover, wherein the first and second mover commands cause the first mover and the second mover to travel together along the track;
positioning the first mover at an unload position;
receiving a second motion trajectory command for the robot at the robot motion controller;
unloading the load from the second mover for the independent cart system with the robot following the second motion trajectory command;
receiving a third motion trajectory command for the robot at the robot motion controller, wherein the third motion trajectory command defines motion of the robot engaging the load as the first mover and the second mover are traveling along the track;
generating the first mover command with the robot motion controller responsive to receiving the third trajectory command;

generating the second mover command with the robot motion controller responsive to receiving the third trajectory command;
transmitting the first mover command to a first segment controller for a first track segment, wherein the first mover is present on the first track segment;
transmitting the second mover command to a second segment controller for a second track segment, wherein the second mover is present on the second track segment; and
in tandem, controlling operation of the first mover with the first segment controller responsive to the first mover command, controlling operation of the second mover with the second segment controller responsive to the second mover command, and controlling operation of the robot with the robot motion controller responsive to the third motion trajectory command.

5. The method of claim 4, wherein the first mover and the second mover travel next to each other along one track.

6. The method of claim 4, wherein:
the track includes at least one parallel divergent track segment adjacent to a main track segment, and
either the first mover or the second mover is controlled to move on the at least one parallel divergent track segment while either the first mover or the second mover is controlled to move on the adjacent main track segment during the first and second mover commands.

7. A method for coordinating motion of a robot with an independent cart system, the independent cart system including a track, having a plurality of track segments, and a plurality of movers configured to travel along the track, the method comprising the steps of:
positioning a first mover for the independent cart system at an initial position, wherein the robot is mounted on the first mover;
receiving a trajectory command defining a desired motion trajectory for the robot at a motion controller, wherein the trajectory command defines desired motion of both the robot and the first mover;
generating a mover command for the first mover as a function of the trajectory command at the motion controller;
generating a robot motion command as a function of the trajectory command at the motion controller;
transmitting the mover command to a segment controller in one of the plurality of track segments on which the first mover is located;
transmitting the robot motion command to a robot control system; and
in tandem, controlling operation of the first mover with the segment controller responsive to the mover command and controlling operation of the robot with the robot control system responsive to the robot motion command to achieve the desired motion trajectory for the robot.

8. The method of claim 7, wherein a load is present on one of the plurality of movers and wherein the trajectory command for the robot coordinates interaction by the robot with the load.

9. The method of claim 8, wherein the load is mounted on a second mover for the independent cart system, the method further comprising the steps of:
generating a mover command for the second mover as a function of the trajectory command at the motion controller;

transmitting the mover command for the second mover to a segment controller in one of the plurality of track segments on which the second mover is located; and in tandem, controlling operation of the first mover and the second mover with the corresponding segment controllers and controlling operation of the robot with the robot control system responsive to the robot motion command.

10. The method of claim 9, wherein:

the track for the independent cart system includes a main track and a parallel track;

the independent cart system includes at least one switch track segment operative to selectively route each of the plurality of movers along the main track or the parallel track;

during a first portion of the mover commands for the first mover and the second mover, the first mover and the second mover are commanded to travel in tandem along the main track;

during a second portion of the mover commands for the first mover and the second mover, one of the first mover and the second mover is commanded to travel along the main track and one of the first mover and the second mover is commanded to travel along the parallel track; and the trajectory command for the robot controls the robot to interact with the load during the second portion of the mover commands.

11. The method of claim 7, wherein a parallel track extends adjacent to the track for the independent cart system and wherein, the desired motion trajectory for the robot coordinates interaction with the parallel track, a vehicle travelling on the parallel track, or a load present on the vehicle travelling on the parallel track.

12. The method of claim 7, wherein:

the track for the independent cart system includes a main track and a queueing track;

the first mover is initially parked on the queueing track; and the first mover travels from the queueing track to the main track responsive to a segment controller for one of the plurality of track segments along the queueing track receiving the mover command.

13. The method of claim 7, wherein the trajectory command is a second trajectory command, the method further comprising the steps of:

receiving a first trajectory command for the robot at the motion controller;

loading a load on one of the plurality of movers for the independent cart system with the robot following the first trajectory command;

generating the mover command and the robot motion command as a function of the second trajectory command;

controlling operation of the first mover with the segment controller responsive to the mover command and controlling operation of the robot with the robot control system responsive to the robot motion command generated from the second trajectory command;

receiving a third trajectory command for the robot at the motion controller; and unloading the load with the robot following the third trajectory command.

14. The method of claim 13, wherein the load is loaded onto the first mover.

15. The method of claim 13, wherein the load is loaded onto a second mover.

16. The method of claim 13, wherein either the first trajectory command or the third trajectory command generates a mover command for the first mover as the robot loads or unloads the load.

* * * * *